United States Patent
Kubo et al.

(10) Patent No.: US 12,472,555 B2
(45) Date of Patent: Nov. 18, 2025

(54) METHOD FOR MANUFACTURING MATERIAL LAYER, METHOD FOR MANUFACTURING THREE-DIMENSIONAL OBJECT, MATERIAL-LAYER-FORMING APPARATUS, AND ADDITIVE MANUFACTURING SYSTEM

(71) Applicant: CANON KABUSHIKI KAISHA, Tokyo (JP)

(72) Inventors: Kenta Kubo, Kamakura (JP); Hiroshi Taniuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/420,526

(22) Filed: Jan. 23, 2024

(65) Prior Publication Data

US 2024/0157438 A1 May 16, 2024

Related U.S. Application Data

(63) Continuation of application No. 16/989,717, filed on Aug. 10, 2020, now Pat. No. 11,911,824, which is a (Continued)

(30) Foreign Application Priority Data

Feb. 14, 2018 (JP) .................................. 2018-024117

(51) Int. Cl.
*B22F 3/10* (2006.01)
*B22F 1/052* (2022.01)
(Continued)

(52) U.S. Cl.
CPC .............. *B22F 3/1021* (2013.01); *B22F 1/10* (2022.01); *B22F 10/10* (2021.01); *B22F 10/43* (2021.01);
(Continued)

(58) Field of Classification Search
CPC ........... H01M 10/056; H01M 10/0585; H01M 2300/0065; H01M 4/139; B32B 37/12;
(Continued)

(56) References Cited

U.S. PATENT DOCUMENTS

2022/0029155 A1\* 1/2022 Zheng .................... H01M 4/626

FOREIGN PATENT DOCUMENTS

JP 2004303759 A \* 10/2004 ............. H01G 11/80
JP 2015153459 A 8/2015

OTHER PUBLICATIONS

Translation JP-2004303759, Takahashi, Oct. 2004.\*

\* cited by examiner

*Primary Examiner* — Philip C Tucker
*Assistant Examiner* — Jimmy R Smith, Jr.
(74) *Attorney, Agent, or Firm* — Canon U.S.A., Inc. IP Division

(57) ABSTRACT

A method for manufacturing a material layer includes a first step S101 of arranging first particles P1 in a pattern on a base material 11 and a second step S102 of arranging second particles in regions in which the first particles P1 are not arranged on the base material 11. The second step S102 includes a step of rubbing bearing materials S2 that carry the second particles P2 against the base material 11 on which the first particles P1 are arranged.

8 Claims, 16 Drawing Sheets

Related U.S. Application Data continuation of application No. PCT/JP2019/005023, filed on Feb. 13, 2019.

(51) Int. Cl.
| | |
|---|---|
| *B22F 1/10* | (2022.01) |
| *B22F 10/10* | (2021.01) |
| *B22F 10/43* | (2021.01) |
| *B22F 10/62* | (2021.01) |
| *B22F 10/64* | (2021.01) |
| *B22F 10/68* | (2021.01) |
| *B22F 10/73* | (2021.01) |
| *B22F 12/13* | (2021.01) |
| *B22F 12/50* | (2021.01) |
| *B22F 12/55* | (2021.01) |
| *B22F 12/57* | (2021.01) |
| *B22F 12/63* | (2021.01) |
| *B22F 12/86* | (2021.01) |
| *B32B 38/10* | (2006.01) |
| *B33Y 30/00* | (2015.01) |
| *B29C 64/147* | (2017.01) |
| *B32B 37/12* | (2006.01) |
| *B33Y 10/00* | (2015.01) |
| *B33Y 70/00* | (2020.01) |

(52) U.S. Cl.
CPC .............. *B22F 10/62* (2021.01); *B22F 10/68* (2021.01); *B22F 12/50* (2021.01); *B22F 12/55* (2021.01); *B22F 12/57* (2021.01); *B32B 38/10* (2013.01); *B33Y 30/00* (2014.12); *B22F 1/052* (2022.01); *B22F 10/64* (2021.01); *B22F 10/73* (2021.01); *B22F 12/13* (2021.01); *B22F 12/63* (2021.01); *B22F 12/86* (2021.01); *B22F 2301/052* (2013.01); *B22F 2301/054* (2013.01); *B22F 2301/15* (2013.01); *B22F 2998/10* (2013.01); *B29C 64/147* (2017.08); *B32B 37/12* (2013.01); *B33Y 10/00* (2014.12); *B33Y 70/00* (2014.12)

(58) Field of Classification Search
CPC ..... B32B 38/10; B29C 64/147; B22F 3/1021; B22F 1/10
See application file for complete search history.

METHOD FOR MANUFACTURING MATERIAL LAYER, METHOD FOR MANUFACTURING THREE-DIMENSIONAL OBJECT, MATERIAL-LAYER-FORMING APPARATUS, AND ADDITIVE MANUFACTURING SYSTEM

CROSS-REFERENCE TO RELATED APPLICATIONS

This application is a Continuation of application Ser. No. 16/989,717, filed Aug. 10, 2020, which is a Continuation of International Patent Application No. PCT/JP2019/005023, filed Feb. 13, 2019, which claims the benefit of Japanese Patent Application No. 2018-024117, filed Feb. 14, 2018, each of which is hereby incorporated by reference herein in their entirety.

TECHNICAL FIELD

The present invention relates to a method for manufacturing a material layer, a method for manufacturing a three-dimensional object, a material-layer-forming apparatus, and an additive manufacturing system.

BACKGROUND ART

An additive manufacturing method in which a three-dimensional object having a predetermined shape is formed by stacking material layers composed of various materials, for example, a metal, a ceramic, and a resin, has attracted attention. In recent years, application fields of the additive manufacturing method have become widespread, and not only mock-ups or parts, which are composed of a single type of material, have been formed but also various devices, for example, batteries, electronic components, wiring substrates, which are composed of a plurality of types of materials, have been formed.

PTL 1 describes a method for manufacturing an all-solid-state battery by using a positive electrode ink containing a positive electrode active material, an electrolyte ink containing a polymer electrolyte, and a negative electrode ink containing a negative electrode active material. In the method described in PTL 1, a layer in which predetermined materials are arranged in a pattern is formed by independently applying each ink by using an ink jet method. The resulting layer is dried to be a material layer, and another material layer is further formed similarly on the material layer. By repeating this, the all-solid-state battery having a structure in which the positive electrode active material, the polymer electrolyte, and the negative electrode active material are arranged in a predetermined three-dimensional pattern is formed.

CITATION LIST

Patent Literature

PTL 1 Japanese Patent Laid-Open No. 2005-116248

According to PTL 1, a material layer in which two types of materials are arranged in a predetermined pattern can be formed by using two types of ink when forming one material layer. However, in the case where a positive electrode ink, a negative electrode ink, and an electrolyte ink of materials to be constituent elements of the battery are applied by the ink jet method, materials other than those for the purpose, for example, a binder resin, a solvent, and a dispersing agent, have to be included in such ink. As a result, there is a problem of the density of each material to be a constituent element in the resulting material layer being reduced.

Accordingly, in consideration of the above-described problem, it is an object of the present invention to provide a method for manufacturing a material layer, wherein the material layer in which a predetermined material is arranged in a predetermined pattern and which contains the predetermined material at a high density can be formed.

SUMMARY OF INVENTION

A method for manufacturing a material layer according to an aspect of the present invention includes a first step of arranging first particles in a pattern on a base material and a second step of arranging second particles in regions in which the first particles are not arranged on the base material, wherein the second step includes a step of rubbing bearing materials that carry the second particles against the base material on which the first particles are arranged.

Further features of the present invention will become apparent from the following description of exemplary embodiments with reference to the attached drawings.

DESCRIPTION OF EMBODIMENTS

The exemplary embodiments for realizing the present invention will be described below in detail with reference to the drawings. However, dimensions, materials, shapes, relative positions, and the like of the members described in the embodiments below are not intended to limit the scope of the present invention to these unless otherwise specified.

First Embodiment

A method for manufacturing a material layer and a material-layer-forming apparatus that are the first embodiment according to the present invention will be described with reference to the drawings.

Figure 1:
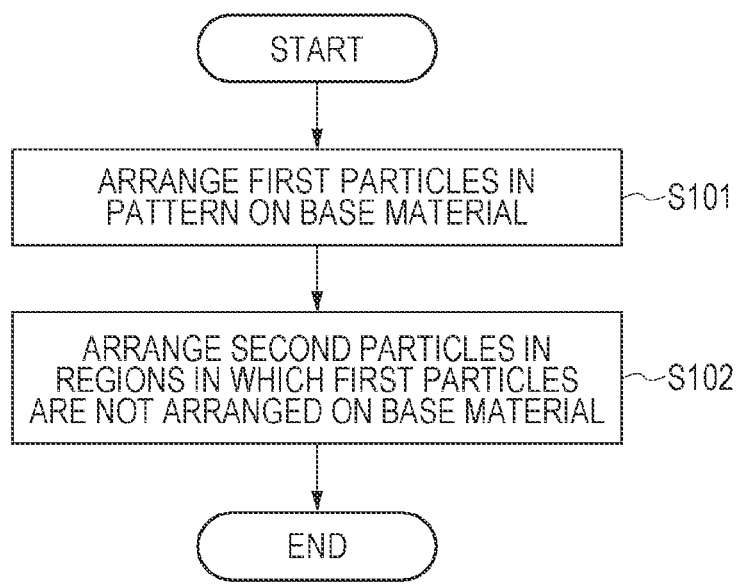
FIG. 1 is a flow chart of a method for manufacturing a material layer.

FIG. 1 is a flow chart of the method for manufacturing a material layer according to the first embodiment.

The method for manufacturing a material layer according to the present embodiment includes the following steps (1) and (2). Each step will be described later.

Step (1): first step (S101) of arranging first particles in a pattern on a base material Step (2): second step (S102) of arranging second particles in regions in which the first particles are not arranged on the base material In this regard, second step S102 includes the step of rubbing bearing materials that carry the second particles against the base material on which the first particles are arranged.

In the method for manufacturing a material layer according to the present embodiment, the second particles can be densely arranged in regions in which the first particles are not arranged on the base material by arranging the first particles on the base material, and thereafter rubbing bearing materials that carry the second particles against the resulting base material. The second particles are retained by the adhesive force due to the base material surface and the adhesive force due to the first particles and the second particles arranged on the base material surface and are densely arranged while the second particles and the bearing materials are rubbed together against the base material. Consequently, the plurality of particles are arranged in a predetermined pattern and the material layer having high denseness can be formed.

In this regard, "rub bearing materials against a base material" includes the case in which bearing materials do not come into direct contact with the base material itself. That is, the above-described expression includes the case in which bearing materials carrying second particles are rubbed against a base material and the second particles only come into direct contact with the base material itself.

There is no particular limitation regarding the method for arranging the first particles in a pattern on the base material in first step S101. For example, the first particles may be arranged in a pattern on the base material by preparing a transfer base material provided with an uneven pattern on the surface, rubbing the bearing materials carrying the first particles against the transfer base material so as to densely arrange the first particles in recessed portions of the uneven pattern, and transferring this to another base material. Alternatively, the first particles may be arranged in a pattern on the base material by using a method in which the base material is coated with a liquid in a pattern, and thereafter a powder containing the first particles is made to adhere. The case in which the bearing materials carrying the first particles are rubbed against the transfer base material so as to densely arrange the first particles in recessed portions of the surface of the transfer base material, and thereafter the first particles are transferred to the base material will be described below.

Figure 2:
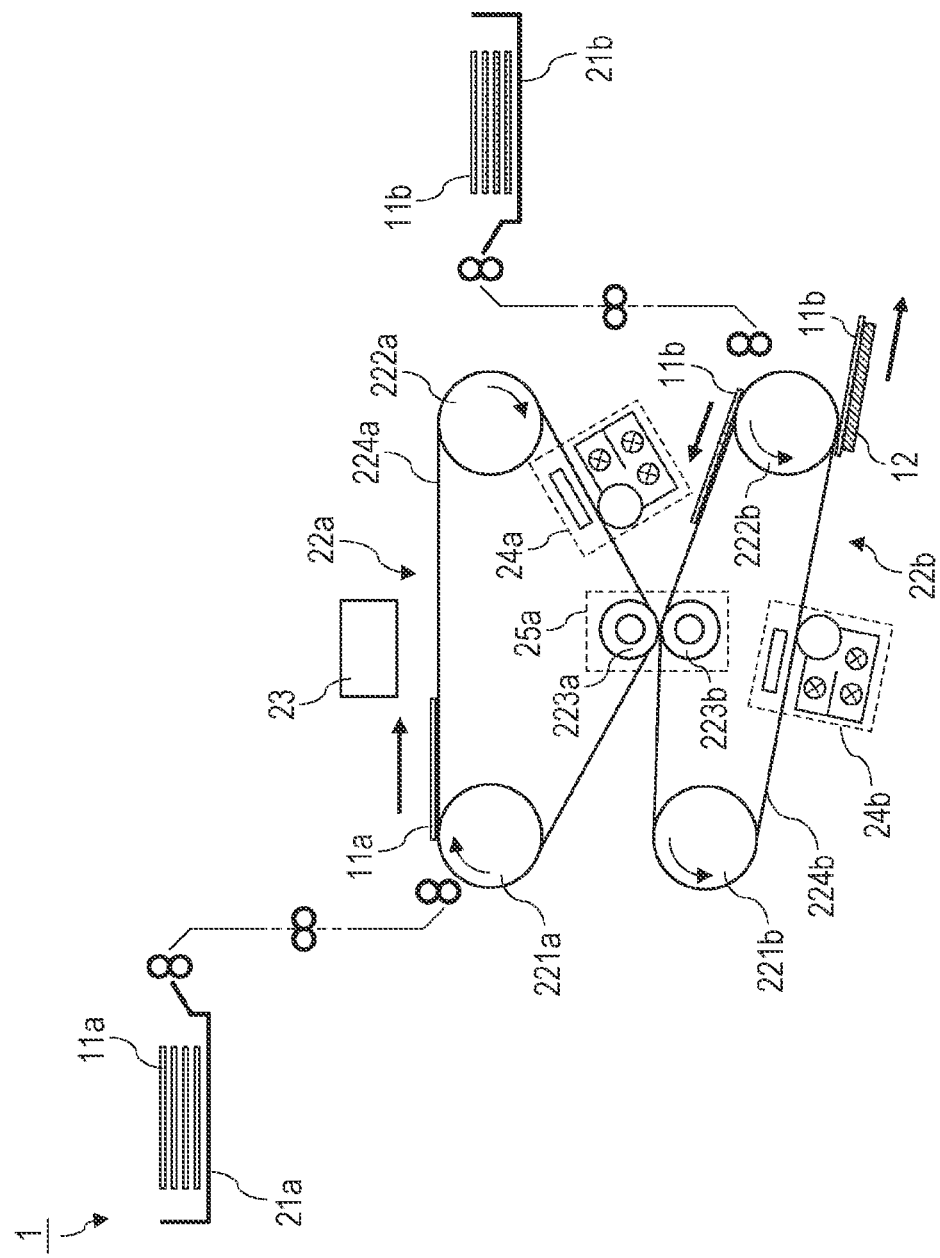
FIG. 2 is a schematic diagram illustrating the configuration of a material-layer-forming apparatus according to a first embodiment.

FIG. 2 is a schematic diagram illustrating the configuration of a material-layer-forming apparatus according to the present embodiment.

A material-layer-forming apparatus 1 according to the present embodiment includes a first storage container 21a that stores and feeds a first base material 11a, a first belt device 22a that transports the first base material 11a, and a pattern-forming device 23 that forms an uneven pattern on the first base material 11a. The material-layer-forming apparatus 1 includes a first filling device 24a that arranges first particles P1 in recessed portions of the uneven pattern formed on the first base material 11a. The material-layer-forming apparatus 1 includes a second storage container 21b that stores and feeds a second base material 11b, and a second belt device 22b that transports the second base material 11b. The material-layer-forming apparatus 1 includes a transfer portion 25a in which a roller included in the first belt device 22a and a roller included in the second belt device 22b oppose each other, and in the transfer portion 25a, the first particles P1 are transferred from the first base material 11a to the second base material 11b. The material-layer-forming apparatus 1 further includes a second filling device 24b that arranges second particles P2 in non-transfer portions on the second base material 11b. In this regard, the devices having a low relationship with description of the effect of the present embodiment, for example, a peeling and recovery device that peels and recovers the first base material 11a after transfer from the first belt device 22a, each cleaning device, and the like are omitted from the drawing and detailed explanations.

In the material-layer-forming apparatus 1, the pattern-forming device 23, the first filling device 24a, and the transfer portion 25a correspond to a first arranging device that arranges the first particles P1 in a pattern on the second base material 11b. Meanwhile, the second filling device 24b corresponds to a second arranging device that arranges the second particles P2 in regions in which the first particles P1 are not arranged on the second base material 11b.

A method for forming a material layer 12 on a base material 11 by using the material-layer-forming apparatus 1 will be described below along the flow on a process basis.

The first base material 11a is fed from the first storage container 21a to the first belt device 22a by using a feed device (not illustrated in the drawing).

There is no particular limitation regarding the material for forming the first base material 11a. However, in the case in which an ultraviolet-curable ink is applied by using the pattern-forming device 23 (described later), it is desirable that at least the surface of the first base material 11a be formed of a material having high wettability with the ultraviolet-curable ink. In addition, it is desirable that the surface of the first base material 11a is smooth. Regarding the first base material 11a, typically, a resin sheet of polyester or the like that has been subjected to hydrophilic treatment or lipophilic treatment in accordance with a predetermined ultraviolet-curable ink (water-based or oil-based) may be used. Regarding the first base material 11a, an individually cut base material such as cut paper may be used or a rolled continuous base material such as roll paper or a z-fold continuous base material such as continuous paper may be used.

The first belt device 22a transports the fed first base material 11a to the pattern-forming portion of the pattern-forming device 23. The first belt device 22a includes a drive rollers 221a and 222a, a pressure roller 223a, and a belt-like transport member 224a looped over these rollers. At this time, the pressure roller 223a is driven to rotate.

It is desirable that the transport member 224a be selected from made of resin, made of metal, and the like. For example, a polyimide resin belt may be used. Desirably, metal rollers are used as the drive rollers 221a and 222a, and, for example, stainless steel metal rollers may be used. Desirably, a soft roller having an elastic layer as the surface layer is used as the pressure roller 223a, and, for example, a soft roller in which a silicone rubber elastic layer is disposed on the surface of a stainless steel core metal may be used.

In the present embodiment, the first belt device 22a is used as the transport device that transports the first base material 11a, but a roller device can also be used instead of the belt device. The same applies to the second belt device 22b described later.

The pattern-forming device 23 forms a fine uneven pattern on the first base material 11a transported to the pattern-forming position. There is no particular limitation regarding the method for forming the uneven pattern, and a UV imprint system, a thermal imprint system, a UV ink jet system, a printing system, a laser etching system, and the like may be used. In the case in which the pattern-forming device 23 forms the uneven pattern by using the UV imprint system, the pattern-forming device 23 includes a coating device that coats the first base material 11a with an ultraviolet-curable composition. In addition, the pattern-forming device 23 includes a stamping device that stamps the ultraviolet-curable composition on the first base material 11a with a mold provided with the uneven pattern on the surface and a light source that applies ultraviolet rays to the ultraviolet-curable composition. Typically, an ultraviolet-curable-type liquid silicone rubber (PDMS) or resin may be used as the ultraviolet-curable composition, a film mold may be used as the mold, and a UV lamp may be used as the light source.

In the case in which the first filling device 24a fills the recessed portions with first particles P1 by using bearing materials S1 carrying the first particles P1, it is desirable that the opening diameter of the recessed portion of the uneven pattern on the first base material 11a be larger than the median diameter of the first particles P1 and smaller than the average size of the bearing materials S1. In this regard, the opening diameter of the recessed portion of the uneven pattern is desirably the opening diameter of the recessed portion in the transverse direction and more desirably the maximum opening diameter of the recessed portion in the transverse direction. Consequently, the first particles P1 can come into contact with the bottom portions (typically bottom surfaces) of the recessed portions of the uneven pattern, but the bearing materials S1 cannot come into contact with the bottom portions of the recessed portions. As a result, the first particles P1 in contact with the bottom portions of the recessed portions can be captured by the uneven pattern, whereas the uneven pattern can be set not to capture the bearing materials S1. In other words, it is desirable that the first particles P1 can come into contact with the bottom portions of the recessed portions of the uneven pattern and the bearing materials S1 cannot come into contact with the bottom portions of the recessed portions of the uneven pattern.

In the present embodiment, the uneven pattern is formed on the first base material 11a by using the pattern-forming device 23, but the present embodiment is not limited to this. A base material provided with an uneven pattern on the surface in advance may be used as the first base material 11a. Alternatively, the uneven pattern may be formed directly on the surface of the transport member 224a of the first belt device 22a by using the pattern-forming device 23, or a transport member having the uneven pattern on the surface may be used as the transport member 224a. In this case, in consideration of the durability, it is desirable that a metal belt of stainless steel, aluminum, or the like be used and that the uneven pattern be formed on the surface by using a micromachining technology such as laser etching, dry etching, or dry etching.

The first base material 11a provided with the uneven pattern on the surface is transported to the filling position of the first filling device 24a by using the first belt device 22a.

Figure 3:
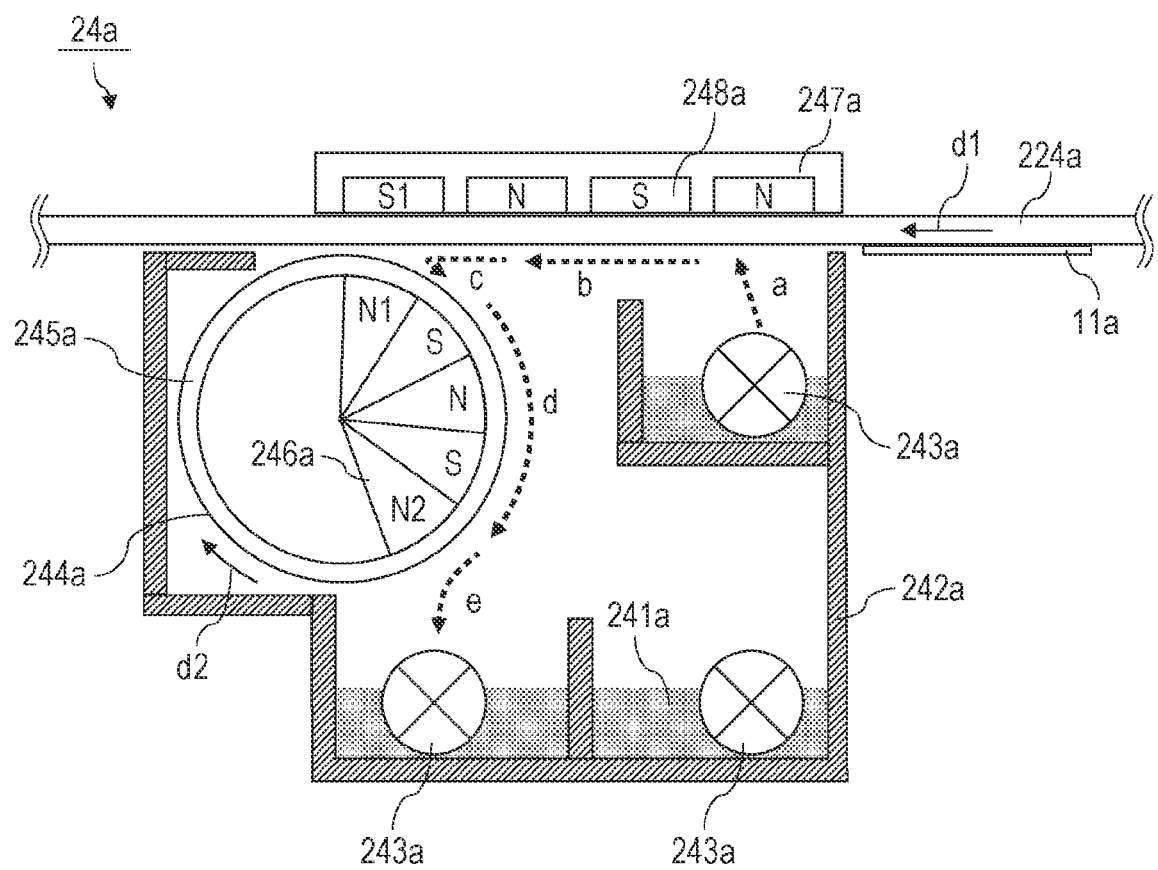
FIG. 3 is a schematic diagram illustrating the configuration of a filling device.

FIG. 3 is a schematic diagram illustrating the configuration of a filling device according to the present embodiment. The configuration of the first filling device 24a will be described below. The same applies to the second filling device 24b.

The first filling device 24a includes a filling container 242a that stores a filler 241a, an agitation screw member 243a that agitates and transports the filler 241a, a recovery member 244a that recovers the filler, and a magnetic member 247a.

The filler 241a includes the first particles P1 and the bearing materials S1 that carry the first particles P1. The filler 241a is a mixture of a plurality of powders including a powder composed of a plurality of first particles P1 and a powder composed of a plurality of bearing materials S1. The filler 241a stored in the filling container 242a is sufficiently mixed and undergoes triboelectric charging when being agitated and transported by the agitation screw member 243a. Consequently, the first particles P1 are carried on the surfaces of the bearing materials S1.

The first particles P1 are particles with which the recessed portions of the uneven pattern formed on the first base material 11a are filled, and there is no particular limitation regarding the material for forming the first particles P1. The first particles P1 may be particulate inorganic materials, for example, metal particles, ceramic particles, and glass particles or may be particulate organic materials, for example, resin particles.

The bearing materials S1 are magnetic particles. It is desirable that the bearing materials S1 be resin particles in which ferrite core particles or magnetic bodies are dispersed, where the surfaces of the resin particles are covered with a resin composition. The particle diameters and the material of the bearing materials S1 are appropriately selected in accordance with the particle diameters and the material of the first particles P1. Consequently, the first particles P1 can be stably carried.

Meanwhile, to improve the chargeability and the aggregation tendency, particles other than the first particles P1 and the bearing materials S1 may be added to the filler 241a, or the surfaces of the first particles P1 may be covered by a resin composition.

The recovery member 244a includes a roller 245a that can rotate in the direction of an arrow d2 in the drawing and a magnet 246a that is arranged inside the roller 245a and that is fixed with respect to the filling container 242a. The magnetic member 247a is arranged opposing the filling container 242a with the transport member 224a interposed therebetween and has a magnet 248a therein. The magnet 246a has a plurality of north poles and south poles alternately arranged in the rotation direction of the recovery member 244a. The magnet 248a has a plurality of north poles and south poles alternately arranged in the transportation direction of the transport member 224a. At the position closest to and opposing the most downstream magnetic pole (S1-pole in the present embodiment) of the magnet 248a, the magnet 246a has the other magnetic pole (N1-pole in the present embodiment), and an N2-pole that is the same pole as the N1-pole is arranged at the most downstream position. In this regard, the magnet 246a and the magnet 248a may be composed of a plurality of magnets, and there is no particular limitation regarding the type of the magnet constituting the magnet 246a and the magnet 248a. Permanent magnets, for example, ferrite magnets, rare-earth magnets such as neodymium magnets and samarium cobalt magnets, and plastic magnets, devices such as electromagnets that generate a magnetic field, and the like may be used. The magnet 248a may be configured to be movable in the transportation direction of the first base material 11a or in the direction opposite thereto. Modified examples of the present embodiment include a form in which carbon black such as acetylene black or a metal or alloy powder is included as a conductive auxiliary to improve the electrical conductivity of the particles P1 and a form in which the surfaces of the first particles P1 are covered by such a conductive auxiliary.

In this regard, a regulation member to regulate the filler 241a on the first base material 11a and a recovery member to further recover the filler 241a that is not recovered by the recovery member 244a may be disposed upstream or downstream, respectively, of the recovery member 244a in the transportation direction of the transport member 224a. Regarding the recovery member for further recovery, the same member as the recovery member 244a, a recovery member to perform recovery from simple members such as a stationary magnet and a regulation member by air blowing, and the like may be used.

Next, the process for filling the recessed portions on the first base material 11a with the first particles P1 by using the first filling device 24a will be described with reference to FIGS. 3 to 5.

The first transport member 224a moving in the direction of a solid-line arrow d1 in FIG. 3 transports the first base material 11a that is carried and transported by the first transport member 224a to the filling position of the first filling device 24a.

The filler 241a is transported by the agitation screw member 243a so as to be fed on the first base material 11a (dotted line a in FIG. 3). At this time, a magnetic field is formed by the magnet 248a and the recovery member 244a, and the filler 241a containing the bearing materials S1 that are magnetic particles form a plurality of magnetic bristles on the first base material 11a due to the magnetic field. The filler 241a fed on the first base material 11a is transported on the first base material 11a in accordance with movement of the first base material 11a while being in the state in which magnetic bristles are formed (dotted line b in FIG. 3).

Figure 4A:
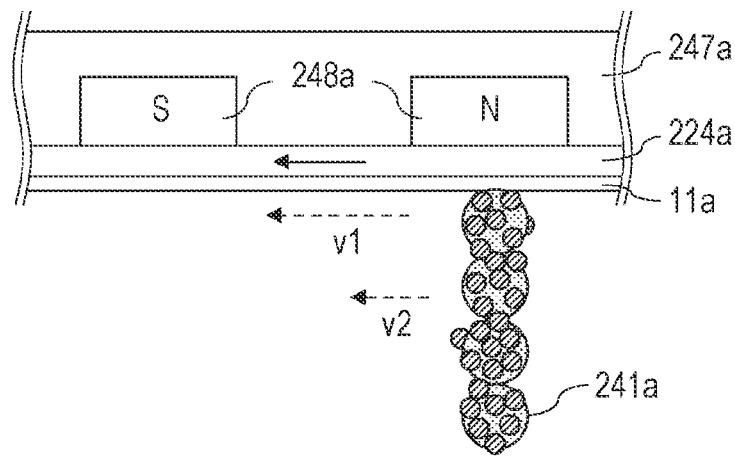
FIG. 4A is a schematic diagram illustrating a filler that is transported on a first base material.
Figure 4B:
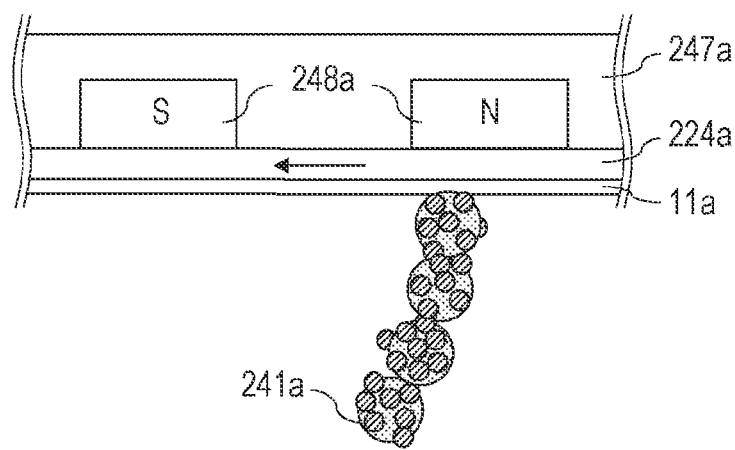
FIG. 4B is a schematic diagram illustrating the filler that is transported on the first base material.
Figure 4C:
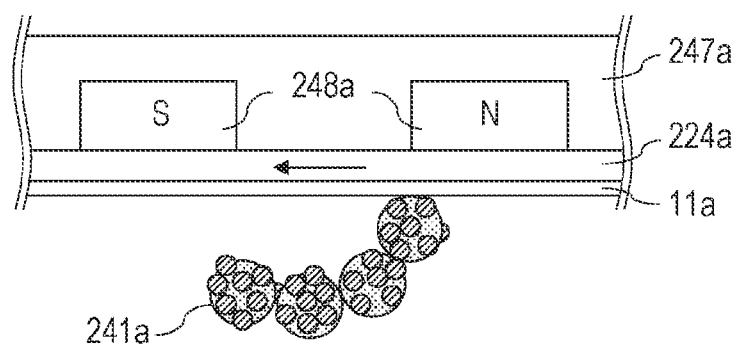
FIG. 4C is a schematic diagram illustrating the filler that is transported on the first base material.

FIG. 4 is a schematic diagram illustrating the filler 241a that is transported on the first base material 11a. For the sake of explanations, the filler 241a other than the filler constituting a magnetic bristle is omitted from the drawings. As described above, the filler 241a on the first base material 11a constitutes a magnetic bristle along the line of magnetic force of the formed magnetic field and is transported while the shape of the magnetic bristle is changed as illustrated in FIG. 4A, FIG. 4B, and FIG. 4C in accordance with movement of the first base material 11a. At this time, in the vicinity of the magnet 248a, since particularly strong magnetic force is applied, the transportation speed v2 of the filler 241a becomes lower than the movement speed v1 of the first base material 11a in the case in which the filler 241a becomes further from the magnetic pole, and the transportation speed v2 becomes higher than the movement speed v1 in the opposite case. That is, the filler 241a on the first base material 11a has a speed that is not 0 relative to the first base material 11a.

Figure 5:
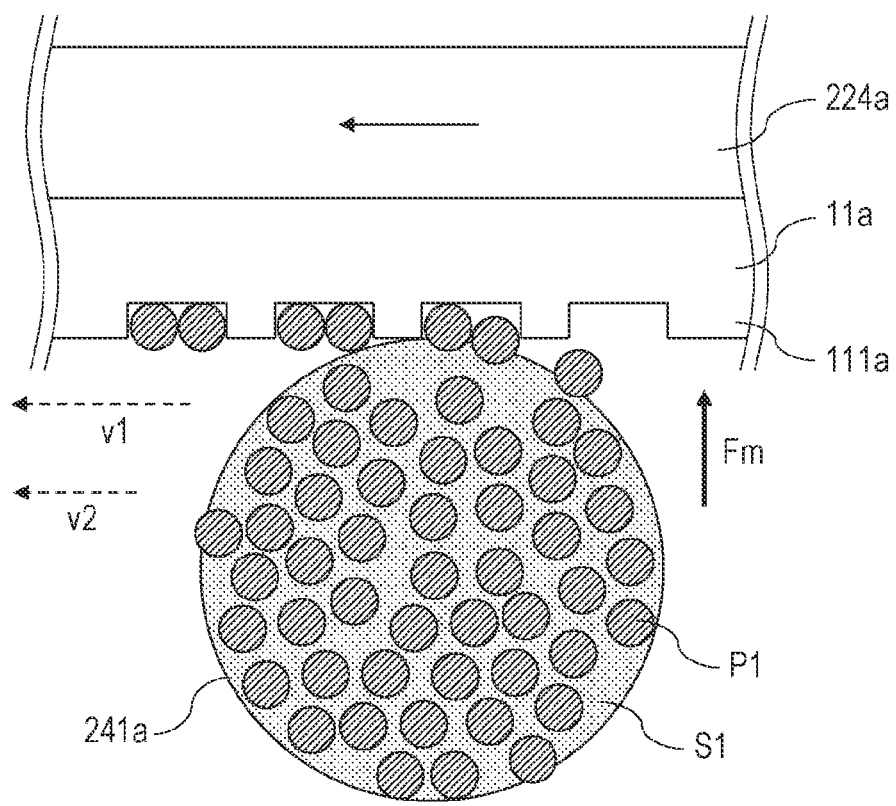
FIG. 5 is an enlarged diagram of the vicinity of the surface of the first base material in a filling process by using a first filling device.

FIG. 5 is an enlarged diagram of the vicinity of the surface of the first base material 11a in FIG. 4. As illustrated in FIG. 5, an uneven pattern 111a is formed on the first base material 11a although omitted from FIG. 4. The filler 241a comes into contact with the uneven pattern 111a and is transported with the first base material 11a while receiving a magnetic force (solid line Fm in the drawing) in the direction perpendicular to the surface of the first base material 11a and having a speed that is not 0 relative to the first base material 11a. Consequently, the first particles P1 carried by the bearing materials S1 are transported while being rubbed against the uneven pattern 111a of the surface of the first base material 11a. At this time, since the particle diameters of the first particles P1 are smaller than the opening diameters of the recessed portions of the uneven pattern 111a and the particle diameters of the bearing materials S1 are larger than the opening diameters of the recessed portions, the first particles P1 can come into contact with the bottom surfaces (bottom portions) of the recessed portions of the uneven pattern 111a but the bearing materials S1 cannot come into contact. That is, in the filler 241a, the first particles P1 only selectively come into contact with the bottom surfaces of the recessed portions. The first particles P1 in contact with the bottom surfaces of the recessed portions are strongly retained by the physical restraining force due to the structure of the uneven pattern 111a and the electrostatic adhesive force and the sticking force to the structural material constituting the first base material 11a and the uneven pattern 111a so as to leave the bearing materials S1.

As illustrated in FIG. 3, the recovery member 244a is arranged downstream of the magnetic member 247a so as to have a distance from the first transport member 224a. The filler 241a transported to the vicinity of the most downstream magnetic pole (S1-pole) of the magnet 248a in accordance with movement of the first base material 11a moves from the first base material 11a to the recovery member 244a under the influence of the magnetic field formed by the magnet 246a so as to be recovered (dotted line c in FIG. 3).

As described above, in the transportation (dotted lines a, b, and c in FIG. 3), the recessed portions of the uneven pattern 111a on the surface of the first base material 11a are in sufficient contact with a plurality of fillers 241a. Consequently, the first particles P1 are selectively densely arranged in the recessed portions of the uneven pattern 111a after the filler 241a is recovered by the recovery member 244a.

In this regard, all first particles P1 illustrated in FIG. 4 and FIG. 5 have the same particle diameter. However, actually, there is a particle size distribution and, further, aggregated secondary particles may be formed in accordance with the material. Even in such a case, since the recessed portions are selectively densely filled with only particles capable of coming into contact with the bottom surfaces of the recessed portions of the uneven pattern 111a, coarse powders, secondary particles, and the like that may adversely affect the formation of the material layer are excluded.

In this manner, the amount of the first particles P1 with which the recessed portions of the uneven pattern 111a are filled can be controlled by the size (area, width, and depth) of the recessed portions and the particle diameter of the first particles P1. Specifically, the area of the recessed portions substantially equal to the filling area, and the layer thickness of the introduced first particles P1 is determined from the depth of the recessed portions. For example, to obtain a thin layer (single layer) having an area that is 50% of the base material area, the area ratio of the recessed portions (the area percentage of the recessed portions relative to the overall uneven pattern) is controlled to be 50%, and the depth of the recessed portions is controlled to be the particle diameter of the first particles P1 or less. At this time, the opening width of the recessed portions is set to be larger than the median diameter of the first particles P1 and smaller than the average size (here, average particle diameter) of the bearing materials S1. In this regard, the first particles P1 may have a wide particle size distribution (broad particle size distribution). However, it is desirable that the bearing materials S1 have a narrow particle size distribution and being monodisperse is more desirable. Consequently, the bearing materials S1 do not readily come into contact with the bottom portions (or bottom surfaces) of the recessed portions. In the case in which the bearing materials S1 come into contact with the bottom portions of the recessed portions, there is a concern that the bearing materials S1 may also be retained by the recessed portions and the recessed portions may be filled with the bearing materials S1.

Further, it is desirable that the opening width of the recessed portions of the uneven pattern 111a be less than 4 times the particle diameter of the first particles P1. Setting the opening width to be less than 4 times the particle diameter of the first particles P1 enables a probability of each of the first particles P1 coming into contact with two places, a bottom surface and a side wall surface, of a recessed portion of the uneven pattern 111a to be increased. Since the first particles P1 in multipoint contact with the uneven pattern 111a, as described above, are strongly retained by the uneven pattern 111a, the efficiency of filling the uneven pattern 111a with the first particles P1 can be increased. In this regard, the same applies to the particle diameter of the second particles P2, described later, and the size of the recessed portions of the uneven pattern formed by the first particles P1. Meanwhile, in the case in which brush fibers are used as the bearing materials, "average particle diameter of the bearing materials" in the above description denotes "average fiber diameter of the bearing materials".

The filler 241a recovered by the recovery member 244a is transported by a rotating roller 244a (dotted line d in FIG. 3). The filler 241a transported by the roller 244a is dropped into the filling container 242a under the influence of a magnetic field due to the same polarity of two adjacent magnetic poles (N1 and N2) that repel each other and the gravity (dotted line e in FIG. 3). Thereafter, agitation and transportation are performed again by the agitation screw member 243a, and this is repeated hereafter.

The weight ratio of the first particles P1 to the bearing materials S1 in the filler 241a in the filling container 242a is determined by a common electrophotographic apparatus, for example, an inductance sensor that measures by using magnetic permeability or a patch concentration sensor that measures the reflection density on the base material or the like and predicts. Subsequently, as the situation demands, at least one of the first particles P1 and the bearing materials S1 are supplied by a supply device (not illustrated in the drawing). Consequently, stable filling can be performed for a long time.

Here, the above-described filling device has a system in which the recessed portions are filled with the particulate material by using magnetic particles as the bearing materials so as to form a so-called magnetic brush. However, the system of the filling device is not limited to this. Brush fibers may be used as the bearing materials. Alternatively, an elastic material in which at least the surface is formed by an elastic body may be used as the bearing material.

Figure 6A:
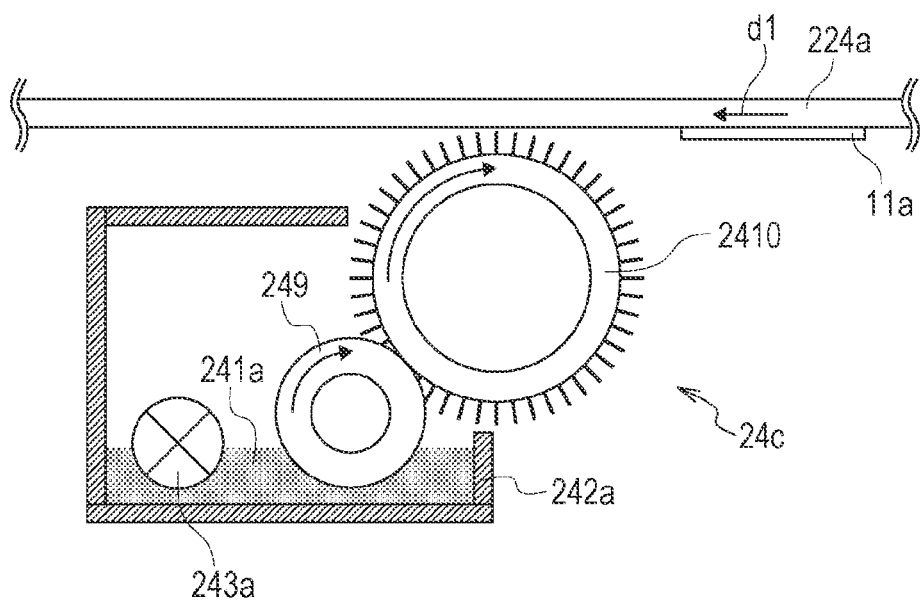
FIG. 6A is a schematic diagram illustrating the configuration of a filling device of the case in which brush fibers are used as bearing materials.

FIG. 6A is a schematic diagram illustrating the configuration of a filling device 24c of the case in which brush fibers are used as the bearing materials.

The filling device 24c includes a roller 2410 having brush fibers on the surface. The roller 2410 is a so-called brush roller in which brush fibers are transplanted to the surface. There is no particular limitation regarding the material for forming fibers that constitute the brush fibers included in the roller 2410, and, for example, nylon, rayon, acryl, vinylon, polyester, and vinyl chloride may be used. For the purpose of adjusting the chargeability and the stiffness, the fiber surface may be subjected to surface treatment.

The filling device 24c includes a feed member that feeds the filler 241a to the roller 2410. The filler 241a contains a powder composed of a plurality of first particles P1 and is stored in the filling container 242a. In this example, the filler 241a does not contain bearing materials S1 that are magnetic particles. The filler 241a is agitated and transported by an agitation screw member 243a and is fed to the feed member 249.

The feed member 249 is a member that feeds the filler 241a to the roller 2410, and there is no particular limitation regarding the configuration. Regarding the feed member 249, for example, a roller in which at least the surface is composed of a porous foamed material having elasticity may be used. Typically, an elastic sponge roller in which a polyurethane foam having a foamed skeleton structure and having relatively low hardness is formed on a core metal may be used. Regarding the material for forming the foamed material, various rubber materials, for example, nitrile rubber, silicone rubber, acrylic rubber, hydrin rubber, and ethylene propylene rubber other than urethane may be used.

A foamed material of the surface of the feed member 249 is filled with the fed filler 241a, and the fed filler 241a is thus transported to a feed portion to come into contact with the roller 2410. In the feed portion, the filler 241a in the foamed material is charged by contact with the brush fibers included in the roller 2410 and is carried by the brush fibers included in the roller 2410. Further, the feed member 249 may also have a function of stripping the filler 241a remaining on the roller 2410 so as to refresh. The filler 241a fed to the roller 2410 comes into contact with the first base material 11a due to movement of the brush fibers.

At this time, the first particles P1 in the filler 241a are allowed to come into contact with the bottom surfaces of the recessed portions of the uneven pattern 111a on the surface of the first base material 11a, but the brush fibers are not allowed to come into contact. That is, the fiber diameter of the brush fibers is made to be larger than the opening width of the recessed portions of the uneven pattern 111a. In this regard, the fiber diameter of the brush fibers can be measured on the basis of the image of the brush fibers obtained by using an optical microscope through glass placed on the surface of the roller 2410. At this time, the diameters of about 100 fibers of the brush fibers are measured, the distribution of the fiber diameters is measured, and an average diameter is calculated.

The brush fibers of the roller 2410 are rubbed against the surface of the first base material 11a due to movement of the transport member 224a and/or rotation of the roller 2410. Consequently, the first particles carried by the brush fibers are densely arranged in the recessed portions of the uneven pattern 111a on the surface of the first base material 11a.

Figure 6B:
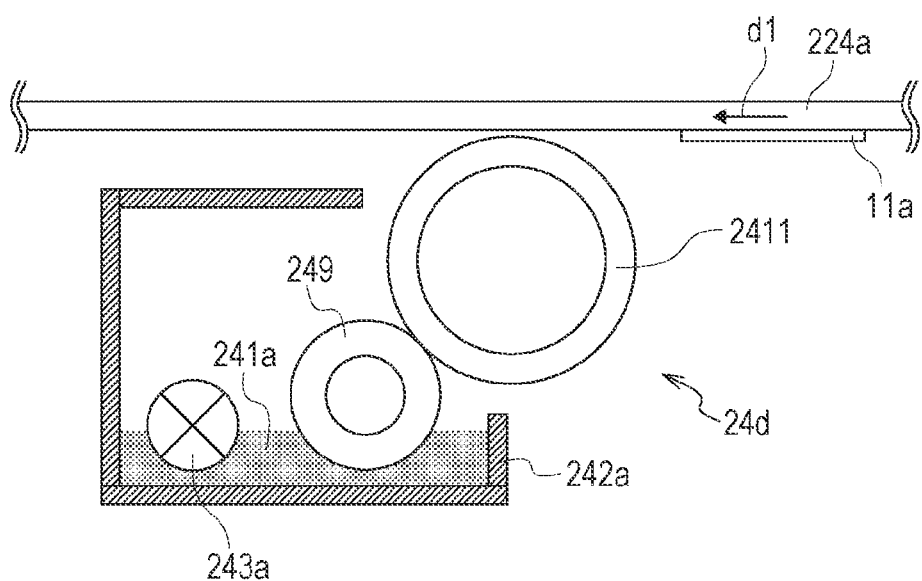
FIG. 6B is a schematic diagram illustrating the configuration of a filling device of the case in which an elastic material is used as a bearing material.

FIG. 6B is a schematic diagram illustrating the configuration of a filling device 24d of the case in which an elastic material is used as the bearing materials.

The filling device 24d has the same configuration as that of the filling device 24c but is different in that a roller 2411 having an elastic material is used instead of the roller 2410 having the brush fibers. The roller 2411 is a roller provided with an elastic layer on the surface. The elastic layer is formed of a material having elasticity, for example, a rubber material such as silicone rubber, acrylic rubber, nitrile rubber, urethane rubber, or fluororubber. The surface shape of the elastic layer may be controlled by adding fine particles of a spherical resin or the like. In the case in which the elastic layer has protruding portions on the surface, the size of the protruding portion of the elastic layer is set to be larger than the recessed portion of the uneven pattern 111a. The size of the protruding portion of the elastic layer can be measured using the same method as for the fiber diameter of the brush fibers above.

The elastic material on the surface of the roller 2411 is rubbed against the surface of the first base material 11a due to movement of the transport member 224a and/or rotation of the roller 2411. Consequently, the first particles carried by the elastic material are densely arranged in the recessed portions of the uneven pattern 111a on the surface of the first base material 11a.

Using the brush fibers and the elastic material as the bearing materials, as illustrated in FIG. 6A and FIG. 6B, eliminates the necessity to include magnetic particles in the filler and enables the configuration of the filling device to be simplified. Meanwhile, in the case in which the magnetic particles are used as the bearing materials as illustrated in FIG. 3, the degree of flexibility of the size or the shape of the bearing material is higher than that in the case of the brush fibers or the elastic material. In addition, in the case of the magnetic particles, the degree of movement flexibility of the bearing materials on the base material is high. For these reasons, in the case in which the magnetic particles are used as the bearing materials, particles such as the first particles P1 can be more efficiently fed onto the base material and the recessed portions on the base material can be more efficiently filled. In the case in which the magnetic particles are used as the bearing materials, even when the bearing materials deteriorate in the process, the bearing materials can be supplemented or replaced without stopping the process.

According to the method in which the recessed portions are filled with particles by rubbing the bearing materials that carry the particles, as in the present embodiment, a larger amount of dispersed particles can be fed to the recessed portions and filling can be stably and densely performed compared with the filling method in which a regulation member such as a blade is used. The merit becomes remarkable as the particle diameters of the introduced particles decrease because the particles readily aggregate.

The first base material 11a in which the recessed portions of the uneven pattern 111a are filled with the first particles P1 by the first filling device 24a is transported to the transfer portion 25a by the first belt device 22a.

As illustrated in FIG. 2, the second belt device 22b includes a drive rollers 221b and 222b, a pressure roller 223b, and a belt-like transport member 224b looped over these rollers, as in the first belt device 22a. At this time, the pressure roller 223b is driven to rotate. In the transfer portion 25a, the pressure roller 223a of the first belt device 22a and the pressure roller 223b of the second belt device 22b are opposite each other.

A second base material 11b is fed from a second storage container 21b to the second belt device 22b and is transported in the arrow direction in FIG. 2. The fed second base material 11b is transported in accordance with the timing of the first base material 11a being transported to the transfer portion 25a. In the transfer portion 25a, the first particles P1 in the first base material 11a are transferred to the second base material 11b. That is, it can be said that the first base material 11a is a transfer base material to transfer the first particles P1 to the second base material 11b. It can be said that the uneven pattern disposed on the surface of the first base material 11a is a transfer uneven pattern. The transfer process will be described below with reference to FIG. 7.

Figure 7:
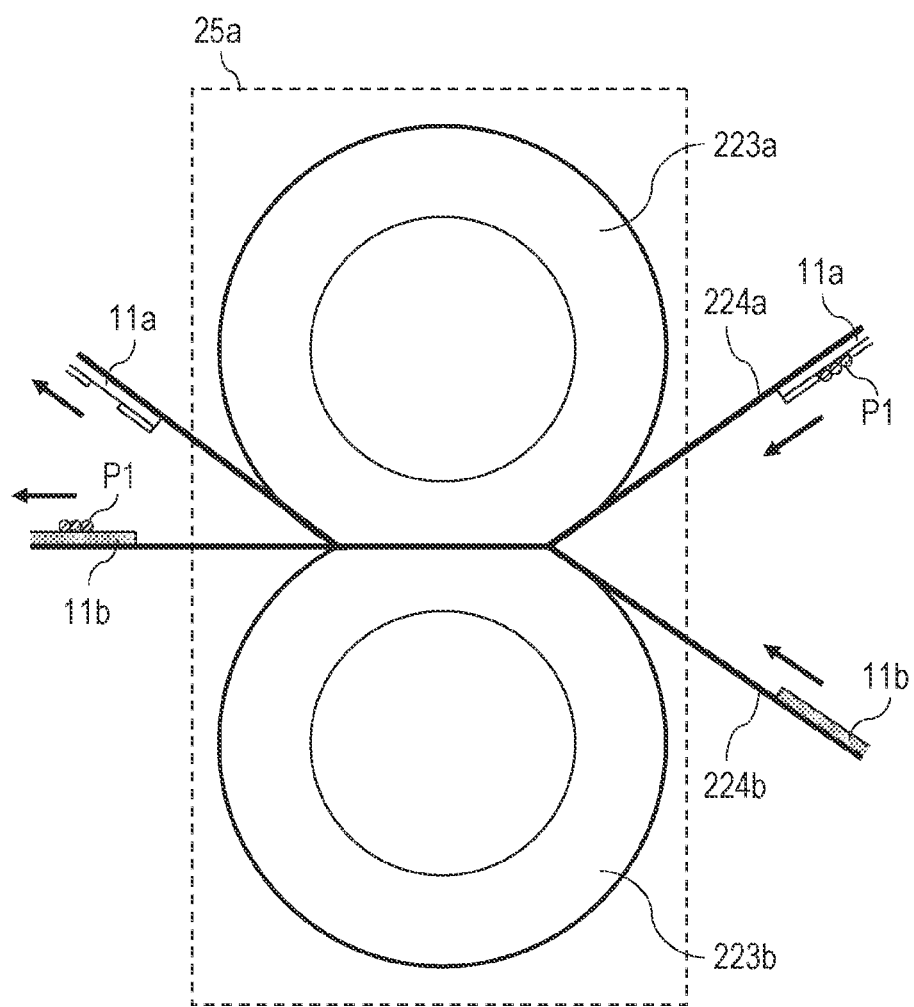
FIG. 7 is a schematic diagram illustrating the configuration of a transfer portion.

FIG. 7 is a schematic diagram illustrating the configuration of the transfer portion 25a. The transfer portion 25a is composed of the pressure roller 223a and the transport member 224a of the first belt device 22a and the pressure roller 223b and the transport member 224b of the second belt device 22b. As described above, the pressure rollers 223a and 223b are driven to rotate, and the two rollers are in contact with each other with the transport members 224a and 224b interposed therebetween. At least one of the pressure rollers 223a and 223b is a soft roller having an elastic layer as the surface layer, and a nip portion is formed as a portion in which the two rollers are in contact with each other.

The first base material 11a filled with the first particles P1 by the first filling device 24a and the second base material 11b are transported by the respective transport members (224a and 224b) at a substantially equal speed and enter the nip portion formed by the pressure rollers 223a and 223b being in contact with each other. In the nip portion, the first particles P1 on the first base material 11a come into contact with the second base material 11b and are transferred to the second base material 11b.

The second base material 11b is a base material having an adhesive force to the first particles P1 larger than the adhesive force of the first base material 11a to the first particles P1. In other words, the adhesive force of the first particles P1 to the second base material 11b is larger than the adhesive force of the first particles P1 to the first base material 11a. Consequently, in the nip portion, the first particles P1 on the first base material 11a are transferred to the second base material 11b.

There is no particular limitation regarding the material for forming the second base material 11b, and a base material formed of the same material as the first base material 11a may be used. In the same manner as for the first base material 11a, the second base material 11b may be an individually cut base material such as cut paper, a rolled continuous base material such as roll paper, or a z-fold continuous base material such as continuous paper.

It is desirable that the second base material 11b have been subjected to surface treatment for the purpose of enhancing the adhesive force so as to transfer the first particles P1 by contact. For example, it is desirable that the second base material 11b have an adhesive layer on the surface by being coated with an adhesive. The adhesive may be an acrylic adhesive, a rubber-based adhesive, or a silicone-based adhesive or be a thermoplastic resin, a photo-curable resin, or the like, the sticking force of which is changed by disturbance such as heat or light. In this regard, both surfaces of the second base material 11b may be coated with the adhesive.

The material-layer-forming apparatus 1 may have a coating device such as a dispenser or an ink jet head to coat the surface of the second base material 11b during transportation with an adhesive.

The type and the amount of the adhesive applied are appropriately adjusted in accordance with, for example, the shape and the material of the uneven pattern used and the particle diameters and the materials of the first particles P1 and the second particles P2, and it is desirable that the adhesive have larger sticking force than the uneven pattern 111a. Regarding comparison of the sticking force, the measurement can be performed by a common technique using a nanoindenter.

In the nip portion, the first particles P1 are retained due to the adhesive force generated between the first particles P1 and the second base material lib. When the transport members 224a and 224b are separated from each other after passing through the nip portion, the first particles P1 located on the first base material 11a are transferred to the second base material 11b.

The second base material 11b to which the first particles P1 have been transferred is transported to the filling position of the second filling device 24b by the transport member 224b.

The second filling device 24b has the same configuration and the function as those of the first filling device 24a except that the filler 241b including the second particles P2 and the bearing materials S2 instead of the filler 241a including the first particles P1 and the bearing materials S1 is stored in the filling container 242a.

The second filling device 24b introduces the second particles P2 in portions in which the first particles P1 are not arranged on the second base material lib. As described above, the first particles P1 are arranged on the second base material 11b passed through the transfer portion 25a, and in the portion in which the first particles P1 are not arranged, recessed portions are formed, so to speak. The second filling device 24b introduces the second particles P2 in the recessed portions by using the same process as in the first filling device 24a. Here, the case in which magnetic particles are used as the bearing materials will be described. However, the brush fibers or the elastic material may be used as the bearing material, as in the first filling device 24a.

The filler 241b includes the second particles P2 and the bearing materials S2 carrying the second particles P2. The filler 241b is a mixture of a plurality of powders including a powder composed of a plurality of second particles P2 and a powder composed of a plurality of bearing materials S2. There is no particular limitation regarding the material for forming the second particles P2. The second particles P2 may be particulate inorganic materials, for example, metal particles, ceramic particles, and glass particles or may be particulate organic materials, for example, resin particles, in the same manner as for the first particles P1. The first particles P1 and the second particles P2 may be formed of the same material. Regarding the bearing materials S2, the same material as for the bearing materials S1 may be used. It is desirable that the first particles P1 and the second particles P2 be selected from positive electrode materials, materials containing a solid electrolyte, and negative electrode materials of lithium ion batteries and all-solid-state batteries.

Figure 8:
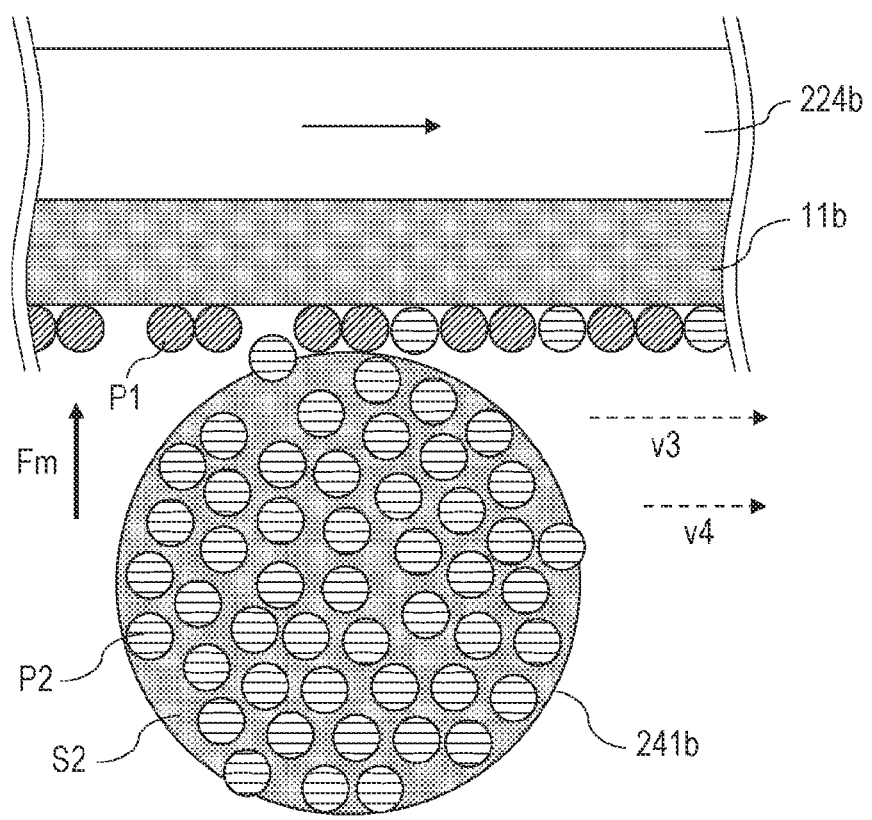
FIG. 8 is an enlarged diagram of the vicinity of the surface of the second base material in a filling process by using a second filling device.

FIG. 8 is an enlarged diagram of the vicinity of the surface of the second base material 11b in a filling process by using a second filling device 24b. On the second base material 11b, an uneven pattern is formed having protruding portions formed by the first particles P1 being arranged and recessed portions in which the first particles P1 are not arranged. The filler 241b comes into contact with the uneven pattern and is transported with the second base material 11b while receiving a magnetic force (solid line Fm in the drawing) in the direction perpendicular to the surface of the second base material 11b and having a speed that is not 0 relative to the second base material 11b. Consequently, second particles P2 carried by the bearing materials S2 are transported while being rubbed against the uneven pattern of the surface of the second base material 11b. At this time, the opening diameters of the recessed portions of the uneven pattern formed on the second base material 11b are set to be the sizes that allow the second particles P2 to come into contact with the bottom surfaces of the recessed portions (second base material 11b) but that do not allow the bearing materials S2 to come into contact. As a result, in the filler 241b, the second particles P2 only selectively come into contact with the bottom surfaces of the recessed portions (second base material 11b). The second particles P2 in contact with the bottom surfaces of the recessed portions are strongly retained by the physical restraining force due to the structure of the uneven pattern and the electrostatic adhesive force and the sticking force to the structural material constituting the second base material 11b and the uneven pattern (here first particles P1) so as to leave the bearing materials S2.

Figure 9A:
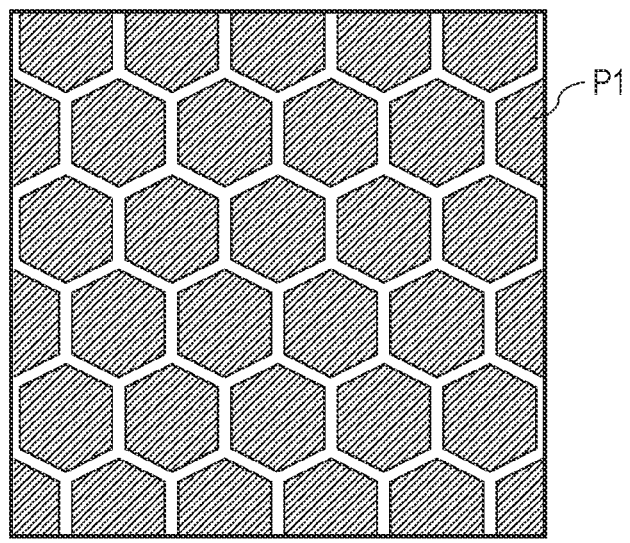
FIG. 9A is a schematic diagram illustrating a second base material after the first particles are transferred by the transfer portion.

FIG. 9A is a schematic diagram illustrating the second base material 11b after the first particles P1 are transferred by the transfer portion 25a and is a diagram when the second base material 11b is viewed in the direction perpendicular to the base material surface. As illustrated in FIG. 9A, on the second base material 11b, a honeycomb pattern is formed where arrangement regions, each including the first particles P1 arranged in a regular hexagonal pattern, are arrayed. The first particles P1 are densely arranged in the regular hexagonal region, and the first particles P1 are not arranged in the other region (white background portion in FIG. 9A) so that the surface of the second base material 11b is exposed. In other words, the regular hexagonal regions in which the first particles P1 are held is a first pattern portion, and the honeycomb pattern region in which the second particles P2 are held and which corresponds to gaps in the first pattern portion is a second pattern portion.

Figure 9B:
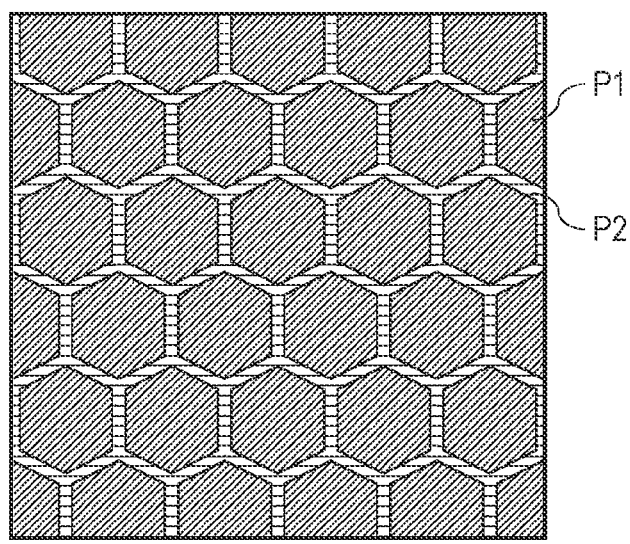
FIG. 9B is a second base material after the second particles are transferred by the transfer portion.

FIG. 9B is a schematic diagram illustrating a second base material 11b after the second particles P2 are introduced by the second filling device 24b and is a diagram when the second base material 11b is viewed in the direction perpendicular to the base material surface. As illustrated in FIG. 9B, the second particles P2 are densely arranged in regions in which the first particles P1 are not arranged. Meanwhile, the first particles P1 and the second particles P2 are densely arranged in boundary portions between the region in which the first particles P1 are arranged and the region in which the second particles P2 are arranged. In this regard, slight clearances between the first particles P1 can be filled with particles by using the same method. In this case, filling can be performed by using a filler containing particles having particle diameters corresponding to the clearances between the first particles P1 by using the same method as above, and a denser thin film can be formed.

Figure 16A:
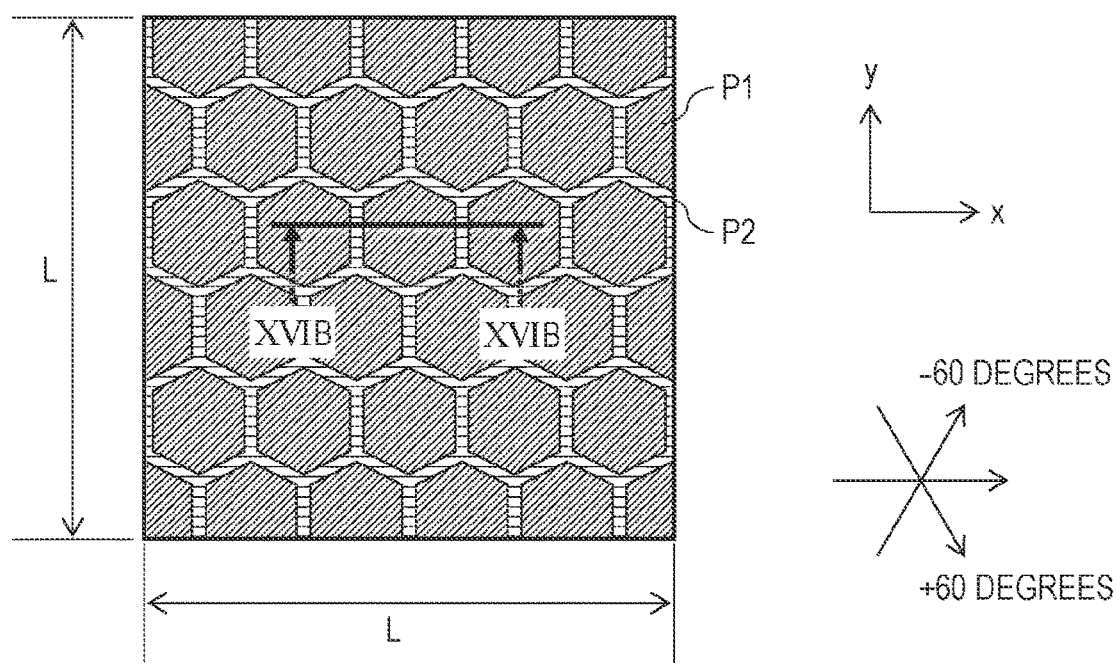
FIG. 16A is a plan view illustrating an embodiment including a material layer to which second particles having smaller average particle diameter than first particles are transferred after the first particles are transferred.
Figure 16B:
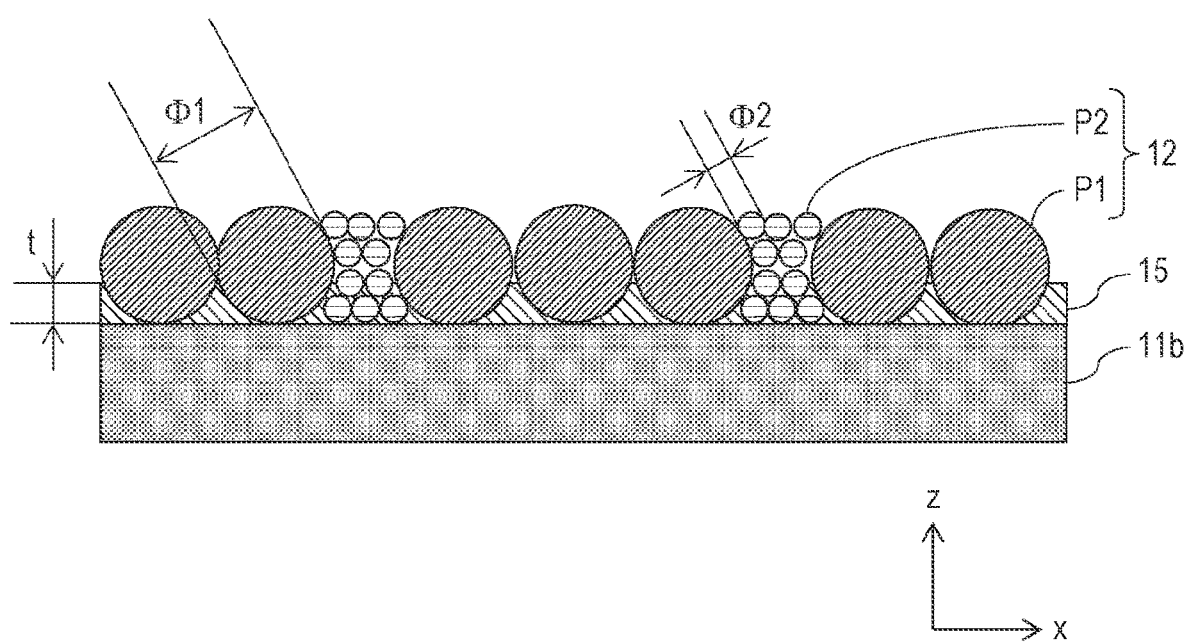
FIG. 16B is a sectional view illustrating the embodiment including the material layer to which second particles having smaller average particle diameter than first particles are transferred after the first particles are transferred.

FIGS. 16A and 16B are a plan view and a sectional view, respectively, illustrating an embodiment including the first pattern portion and the second pattern portion in which the first particle group P1 and the second particle group P2, respectively, having average particle diameters that differ from each other are laid all over the base material 11b. The sectional view illustrated in FIG. 16B corresponds to a sectional view of the section XVIB-XVIB in FIG. 16A.

As illustrated in FIG. 16A, the first pattern portion and the second pattern portion corresponding to the first particle group P1 and the second particle group P2, respectively, have the same repetition period of L/5 in the x-direction. In the same manner, the first pattern portion and the second pattern portion have the same repetition period of L/5 in the direction that is rotated $+\pi/3$ radian (+60 degrees) relative to the x-direction and also in the direction that is rotated $-\pi/3$ radian (−60 degrees) relative to the x-direction.

In the present embodiment, as illustrated in FIG. 16B, since the first particle group P1 and the second particle group P2 having average particle diameters that differ from each other are laid all over the first pattern portion and the second pattern portion, respectively, the surface densities of the particle groups held in the first pattern portion and the second pattern portion differ from each other. In the present embodiment, the area density of arrangement of the first particle group P1 in the first pattern portion is lower than the area density of the second particle group P2 in the second pattern portion.

In the present embodiment, the second particle group P2 is stacked not only in the portion in contact with the base material 11 but also in the base material thickness direction (z-direction) of the base material 11b, and the second pattern portion is filled with the second particle group P2. In the case in which the first particle group P1 and the second particle group P2 are selected as the functional elements of a secondary battery, a combination of the same type of materials, that is, between positive electrode active materials, between negative electrode active materials, or between electrolytes, may be selected, or a combination of different types of materials such as a positive electrode active material and an electrolyte or a negative electrode active material and an electrolyte may be selected.

In the present embodiment, as illustrated in FIG. 16B, the first particle group P1 and the second particle group P2 are held on the base material 11b by an adhesive layer 15. The form of holding of the particles on the base material is in accordance with the layer thickness t of the adhesive layer 15 and the particle diameter $\phi$ of the particles. In the present embodiment, base material-11b-side part of each particle of the first particle group P1 ($\phi 1 > t$) is in contact with the adhesive layer 15. Particles of the first-layer particle group and some particles of the second-layer particle group, which are located on the base material-11b side of the second particle group P2 ($\phi 2 < t$), have respective portions in contact with the adhesive layer 15. In the case in which the layer thickness of the adhesive layer 15 is larger than the average particle diameter of each of the first particle group P1 and the second particle group P2, the first particle group P1 and the second particle group P2 may be in the form of being embedded in the adhesive layer 15 (not illustrated in the drawing).

The adhesive layer 15 is not limited to persistently maintaining the stickiness and the sticking force may deteriorate within the bounds of maintaining the form in which the first particle group P1 and the second particle group P2 are held on the base material 11b. Therefore, the adhesive layer 15 may be called a holding layer 15. The holding layer 15 (adhesive layer 15) includes a form in which the sticking force deteriorates with time and a form in which the sticking force deteriorates due to post-treatment. Examples of the post-treatment include heat-curing treatment and UV curing. It is desirable that the sticking force of the holding layer 15 (adhesive layer 15) deteriorate after the first particle group P1 and the second particle group P2 are held on the base material 11b, because adhesion of dust, pollutants, and the like from the environment are reduced so as to maintain the purity of a material layer 12.

As described above, according to the material-layer-forming apparatus 1 of the present embodiment, a material layer in which the first particles P1 and the second particles P2 are densely arranged in a pattern can be formed on the second base material 11b. Specifically, according to the present embodiment, in each material layer, the coverage of the base material by the particles can be set to be 80% or more. The coverage of the base material by the particles can be measured by imaging the region provided with the material layer in the direction perpendicular to the base material by using an optical microscope and calculating the area percentage of particles in the region by using image processing software.

In the present embodiment, the case in which the material-layer-forming apparatus 1 forms the material layer by using two types of particle materials is described, although the embodiment is not limited to this. The material layer may be formed by using a single type of particle material, or the material layer may be formed by using at least three types of particle materials.

In the case in which the material layer is formed by using a single type of particle material, both the first filling device 24a and the second filling device 24b may introduce particle materials formed of the same material. Consequently, a material layer in which a single type of material is more densely arranged can be formed. At this time, the particles used for the first particles P1 in the first filling device 24a and the particles used for the second particles P2 in the second filling device 24b may be the same material but have different particle diameters. For example, using particles having smaller particle diameter than the first particles P1 as the second particles P2 enables a still denser material layer to be formed.

Meanwhile, in the case in which the material layer is formed by using at least three types of particle materials, a third filling device may be added downstream or upstream of the first filling device 24a or the second filling device 24b. At this time, it is desirable that the particle diameter of the particles introduced by the upstream filling device be set to be larger than the particle diameter of the particles introduced by the downstream filling device. It is desirable that a plurality of recessed portions having different sizes be formed on the base material, and the particles introduced by the upstream filling device be set to come into contact with the bottom portions of some of the recessed portions only. Consequently, a material layer in which at least three types of particle materials are used and respective particles are densely arranged in a pattern can be formed.

Although the configuration is complex, a plurality of first belt devices 22a may be disposed, and the respective devices may be configured to transfer different particles to the second base material 11b. Alternatively, a third belt device including a third filling device may be disposed, and a transfer portion composed of the second belt device 22b and the third filling device may be configured to transfer the first particles and the second particles from the second base material 11b in which the particles are arranged to a third base material. Thereafter, a portion in which neither the first particles nor the second particles are arranged on the third base material is filled with third particles by the third filling device. As a result, the material layer can be formed of at least three types of particle materials.

As described above, the method for manufacturing a material layer according to the present embodiment is a dry process capable of densely arranging particles in any pattern on a base material and can be performed in the air. Consequently, these methods can be realized with ease in configuration and environment since there is no need to control a solvent, to adjust an air conditioner and the degree of vacuum, and the like which are essential for wet processes (for example, a coating method and an ink jet method) and vapor phase growth methods in the related art. The method for manufacturing a material layer according to the present embodiment has a merit that the thickness of the material layer can be readily adjusted by adjusting the particle diameter of the particles used and the depth of the recessed portion of the uneven pattern and by stacking a plurality of base materials.

Consequently, according to the material-layer-forming apparatus 1 of the present embodiment, a material layer in which a single type of or a plurality of types of particles are arranged in any pattern on the base material 11b and the particles are densely arranged can be formed.

Method for Determining Structure of Uneven Pattern

Regarding the uneven pattern 111a in the present embodiment, it is desirable that the first particles P1 can come into contact with the surface of the base material 11a (bottom surfaces of the recessed portions of the uneven pattern 111a) and that the bearing materials S1 carrying the first particles P1 cannot come into contact.

The structure of the uneven pattern can be determined by using AFM (Nano-I produced by Pacific nanotechnology). In this regard, in the case in which the uneven pattern is formed on the surface of the member such as a roller, a replica of the uneven pattern may be produced on a smooth base material or the like by using an ultraviolet-curable resin, a thermoplastic resin, or the like, and the resulting uneven pattern may be used for determining the structure.

When the structure of the uneven pattern is determined, a cantilever A with a hemispherical tip corresponding to the particle diameter r of the first particles P1 and a cantilever B with a hemispherical tip corresponding to the particle diameter rc of the bearing materials S1 to carry are used as cantilevers (probes) of AFM. The target uneven pattern is measured by using each of the two types of cantilevers. In the case in which the first particles P1 can come into contact with the bottom surface of the recessed portion of the uneven pattern, the uneven structure is observed by measurement using the cantilever A, where typically a flat surface of the recessed portion is observed. Meanwhile, in the case in which the bearing materials S1 cannot come into contact with the bottom surface of the recessed portion of the uneven pattern, the depth of the recessed portion of the uneven pattern measured by using the cantilever B is smaller than the measurement result by using the cantilever A. In this manner, measurements and comparisons of the depth and the like of the recessed portion of the uneven pattern by using the two types of cantilevers enable the possibility of coming into contact with the bottom surface of the uneven pattern to be determined.

According to the first embodiment, a material layer in which a patter layer is disposed on a predetermined base material can be provided.

The pattern layer is configured to have a first region in which a plurality of first particles that are configured to contain a first inorganic material and that are before subjected to sintering treatment are arranged and a second region in which a plurality of second particles that are configured to contain a second inorganic material and that are before subjected to sintering treatment are arranged.

Inorganic Material

Examples of the inorganic material include at least any one of positive electrode materials, electrolyte materials, and negative electrode materials. Specifically, examples of the positive electrode material include lithium-containing complex metal oxides, chalcogen compounds, and manganese dioxide. The lithium-containing complex metal oxides are metal oxides containing lithium and a transition metal or metal oxides in which some of the transition metal element in the metal oxide is substituted with other element. In this regard, examples of the other element include Na, Mg, Sc, Y, Mn, Fe, Co, Ni, Cu, Zn, Al, Cr, Pb, Sb, and B. The other element may be one type or two or more types. Of these, lithium-containing complex metal oxides are desirable. Examples of the lithium-containing complex metal oxides include $Li_xCoO_2$, $Li_xNiO_2$, $Li_xMnO_2$, $Li_xCo_yNi_{1-y}O_2$, $Li_xCo_yMn_{1-y}O_z$, $Li_xNi_{1-y}M_yO_z$, and $Li_xMn_2O_4$. Examples of the lithium-containing complex metal oxides further include $Li_xMn_{2-y}M_yO_4$, $LiMPO_4$, and $Li_2MPO_4F$. In the formulae, M represents at least one selected from a group consisting of Na, Mg, Sc, Y, Mn, Fe, Co, Ni, Cu, Zn, Al, Cr, Pb, Sb, V, and B. In the formulae, x, y, and z satisfy $0<x\leq1.2$, $0<y<0.9$, and $2.0\leq z\leq2.3$. Examples of the lithium-containing complex metal oxides further include $LiMeO_2$ (in the formula, Me represents Me=MxMyMz: each of Me and M is a transition metal, and x+y+z=1). Specific examples of the lithium-containing complex metal oxides include $LiCoO_2$ (LCO: lithium cobaltate), $LiNi_{0.5}Mn_{1.5}O_4$ (LNMO: lithium nickel manganate). Specific examples of the lithium-containing complex metal oxides include $LiFePO_4$ (LFP: lithium iron phosphate) and $Li_3V_2(PO_4)_3$ (LVP: lithium vanadium phosphate). The above-described positive electrode material may contain a conductive auxiliary. Examples of the conductive auxiliary include graphite such as natural graphite and artificial graphite and carbon black such as acetylene black, ketjenblack, channel black, furnace black, lamp black, and thermal black. In addition, examples of the conductive auxiliary include conductive fibers such as carbon fibers, carbon nanotubes, and metal fibers, metal powders such as fluorocarbon and aluminum, conductive whiskers such as zinc oxide, conductive metal oxides such as titanium oxide, and organic conductive materials such as phenylene dielectrics.

Examples of the electrolyte materials include oxide-based solid electrolytes, sulfide-based solid electrolytes, and complex-hydride-based solid electrolytes. Examples of the oxide-based solid electrolyte include Nasicon-type compounds such as $Li_{1.5}Al_{0.5}Ge_{1.5}(PO_4)_3$ and $Li_{1.3}Al_{0.3}Ti_{1.7}(PO_4)_3$ and garnet-type compounds such as $Li_{6.25}La_3Zr_2Al_{0.25}O_{12}$. Examples of the oxide-based solid electrolyte include perovskite-type compounds such as $Li_{0.33}Li_{0.55}TiO_3$. Examples of the oxide-based solid electrolyte include silicon-type compounds such as $Li_{14}Zn(GeO_4)_4$ and acid compounds such as $Li_3PO_4$, $Li_4SiO_4$, and $Li_3BO_3$. Specific examples of the sulfide-based solid electrolyte include $Li_2S$—$SiS_2$, $LiI$—$Li_2S$—$SiS_2$, $LiI$—$Li_2S$—$P_2S_5$, $LiI$—$Li_2S$—$P_2O_5$, $LiI$—$Li_3PO_4$—$P_2S_5$, and $Li_2S$—$P_2S_5$. The solid electrolyte may be crystalline, may be amorphous, or may be glass ceramic. In this regard, the expression of $Li_2S$—$P_2S_5$ or the like denotes a sulfide-based solid electrolyte produced by using a material containing $Li_2S$ and $P_2S_5$.

Examples of the negative electrode material include metals, metal fibers, carbon materials, oxides, nitrides, silicon, silicon compounds, tin, tin compounds, and various alloy materials. Of these, from the viewpoint of the capacity density, oxides, carbon materials, silicon, silicon compounds, tin, tin compounds and the like are desirable. Examples of the oxide include $Li_4Ti_5O_{12}$ (LTO: lithium titanate). Examples of the carbon material include various types of natural graphite (graphite), coke, graphitizing carbon, carbon fibers, spherical carbon, various types of artificial graphite, and amorphous carbon. Examples of the silicon compound include silicon-containing alloys, silicon-containing inorganic compounds, silicon-containing organic compounds, and solid solutions. Examples of the tin compound include $SnO_b$ (0<b<2), $SnO_2$, $SnSiO_3$, $Ni_2Sn_4$, and $Mg_2Sn$. The above-described negative electrode material may contain a conductive auxiliary. Examples of the conductive auxiliary include graphite such as natural graphite and artificial graphite and carbon black such as acetylene black, ketjenblack, channel black, furnace black, lamp black, and thermal black. In addition, examples of the conductive auxiliary include conductive fibers such as carbon fibers, carbon nanotubes, and metal fibers, metal powders such as fluorocarbon and aluminum, conductive whiskers such as zinc oxide, conductive metal oxides such as titanium oxide, and organic conductive materials such as phenylene dielectrics.

Regarding the first inorganic material and the second inorganic material, the same material may be selected or materials that differ from each other may be selected. The first region may contain a plurality of types of particles together.

Regarding a desirable combination of the first inorganic material and the second inorganic material, in the case of the electrode base material, the first inorganic material is set to be the positive electrode material or the negative electrode material, and the second inorganic material is set to be the electrolyte material. In the case of the electrolyte base material, the first inorganic material and the second inorganic material may be set to be the same electrolyte material or to be different electrolyte materials.

The particle diameter (average particle diameter) of each of the first particles and the second particles is, for example, 0.05 μm or more and 100 μm or less (wide range), preferably 0.1 μm or more and 50 μm or less (middle range), and further preferably 0.5 μm or more and 25 μm or less (narrow range). From the viewpoint of denseness, it is desirable that the particle diameter is decreased, and the lower limit is set in consideration of the material cost and deterioration of an aggregation tendency. The upper limit is set in consideration of deterioration of the denseness. The average particle diameter is measured by using, for example, a laser diffraction-scattering particle diameter distribution analyzer.

The average particle diameter of the first particle group and the average particle diameter of the second particle group may be set to differ from each other. For example, in the case in which the first region is formed first and the second region is formed thereafter, it is desirable that the relationship between the particle diameters of the particle groups arranged in the two regions be set to satisfy the average particle diameter of the first particle group the average particle diameter of the second particle group. Interstices and gaps in which the first particle group is not arranged on the base material $11b$ are filled with the second particle group. The second particle group is arranged on the base material $11b$, and the base material $11b$ is filled with the particle group due to the adhesive force of the surface of the base material $11b$ and the restraining force of the uneven pattern formed by the first particle group on the base material $11b$. Therefore, to stably and densely introduce, it is desirable that the average particle diameter of the second particle group is smaller than the average particle diameter of the first particle group.

The filling density of the first region with the first particles is, for example, 30% or more (wide range; higher filling density is desirable; the lower limit only is described because setting of the upper limit is difficult in practice), preferably 50% or more, and further preferably 70% or more. The filling density is measured, for example, on the basis of the proportion (%) of the total pixel number of particle images relative to the pixel number of the overall image in the first region on the base material, where the base material is imaged by using an optical microscope or an electron microscope and the resulting image is subjected to binarization with respect to presence or absence of particle by image processing software.

The filling density of the first region with the first particles and the filling density of the second region with the second particles may be set to differ from each other. For example, in the case in which the first region is formed first and the second region is formed thereafter, a form in which the second region (second pattern portion) has a higher filling density than the first region (first pattern portion) can be realized in accordance with selective particle patterning using a particle diameter difference.

A plurality of first particles before subjected to sintering treatment sinter by being fired at a predetermined sintering temperature or higher.

The particles arranged in the first region and the second region are not limited to the inorganic material, and the material (metal material, organic material, or the like) described in the present embodiment, other embodiments, or examples may be appropriately used in accordance with the use.

Pattern Layer

The pattern layer is a repetitive pattern in which a plurality of first regions are repeatedly arranged at a predetermined period in the in-plane direction of the base material and may be configured to dispose the second region between the first regions.

The pattern included in the pattern layer is a pattern configured to have the first region and the second region (in some cases, another region may be included). Examples include a honeycomb-shaped honeycomb pattern. In addition to the honeycomb pattern, a hole pattern in which circles are repeatedly arranged in the in-plane direction, a tetragonal pattern in which tetragons are arranged, a triangular pattern in which triangles are arranged, and other patterns in which anything other than shapes is repeatedly arranged are included. The same applies to the case of a line pattern in which vertical lines, horizontal lines, slanted lines, or a mixture of these lines are repeatedly arranged in contrast to the patterns in which isolated shapes are arranged in plane, as the above-described patterns.

Examples of the pattern form include a repetitive pattern having a repetitive structure in the in-plane direction of the base material, a random pattern, and a gradation. The repetitive pattern having a repetitive structure in the in-plane direction of the base material is also referred to as a repetitive pattern having a repetitive structure in the layer of the pattern layer.

Further, a configuration in which a pattern with another period is also present in addition to the pattern with a basic period may be used. Whether such a pattern is included can be determined by, for example, acquiring an image in the in-plane direction on the base material, extracting the features of the image by performing image processing, and performing Fourier analysis so as to acquire spatial frequency spectrum.

Regarding the pattern composed of the first region or the second region on the base material, in the case in which the size (for example, the size of the first region in the in-plane direction) is small, the manufacturing method described in the present embodiment is effective. For example, it is desirable that the minimum width of the first region on the base material be larger than the average particle diameter of the first particles P1 and less than 4 times the average particle diameter. In this regard, the minimum width is the diameter of the maximum circle of circles that fall within the first region. That is, the diameter of the maximum circle of circles that fall within a hexagon in the case of a honeycomb pattern and is the diameter of the maximum circle of circles that fall within a circle in the case of a hole pattern, and the same applies to a tetragonal pattern and a triangular pattern. In the case of a line pattern, the minimum width is the diameter of the maximum circle of circles that fall within the line, that is, the length of a short side of the line.

Regarding variations in the height in the first region (and/or the second region) constituting the pattern, the range of the height is 3 times or less the average particle diameter of the first particles P1, preferably 2 times or less the average particle diameter, and further preferably the average particle diameter or less. In this regard, the range of the height is the difference between maximum value and the minimum value of the height in the first region.

Base Material

It is desirable that the base material be configured to have a thermal decomposition property or solvent solubility different from that of the first region and the second region constituting the sheet-like pattern layer. For example, the first region and the second region may be formed of mainly inorganic materials and the base material may be formed of an organic material.

As the base material, for example, polyethylene terephthalates or polyesters may be used.

The coverage of the first region and/or the second region of the base material is 80% or more, preferably 85% or more, and further preferably 90% or more.

Multilayer Body

A multilayer body in which a plurality of pattern layers are stacked can be formed by stacking a plurality of base materials provided with the pattern layer so as to form a structure and by thermally decomposing the base material in the structure or dissolving the base material with a solvent.

The multilayer body including the pattern layers configured to have the first region and the second region can be provided, wherein the plurality of pattern layers are stacked.

The pattern layers composed of the first region and the second region in the in-plane direction may be configured to include respective portions having respective phases that do not match between pattern layers when viewed in the stacking direction. For example, the pattern layers may be configured to include respective portions having respective phases that do not match with each other by intentionally shifting the phases between pattern layers in the case of the honeycomb pattern or by also shifting the phases or shifting the line angle between the pattern layers in the case of the line pattern. Consequently, particle positions are shifted between the pattern layers, and an effect of improving the denseness of the particles when stacking is exerted. In the case in which the multilayer body is a part that constitutes an all-solid-state battery, for example, an electrode, shifting the particle positions between the pattern layers enables the following effects to be expected. That is, shifting the particle positions between the pattern layers facilitates the electrode active material and the solid electrolyte coming into contact with each other in the sacking direction so as to reduce the electrode active material that is isolated because of being not able to come into contact with the solid electrolyte in the electrode, and, as a result, the capacity can be improved. In addition, regarding the volume change of the electrode active material in accordance with charging and discharging, since contact with the solid electrolyte and the conductive auxiliary, which relax the volume change, is facilitated, there is an effect of improving the cycle characteristics.

The material layer obtained in the present embodiment includes the pattern layer and the base material provided with the pattern layer. The pattern layer is configured to contain the first inorganic material and is configured to have the first region in which a plurality of first particles that are configured to contain the first inorganic material and that are before subjected to sintering treatment are arranged and the second region in which a plurality of second particles that are configured to contain the second inorganic material and that are before subjected to sintering treatment are arranged.

Second Embodiment

A method for manufacturing a material layer and a material-layer-forming apparatus that are the second embodiment according to the present invention will be described with reference to the drawings. In first step S101 of the present embodiment, first particles are arranged in a pattern on a base material by a system in which the base material is coated with a liquid in a pattern and, thereafter a powder containing the first particles is attached to the resulting liquid.

Figure 10:
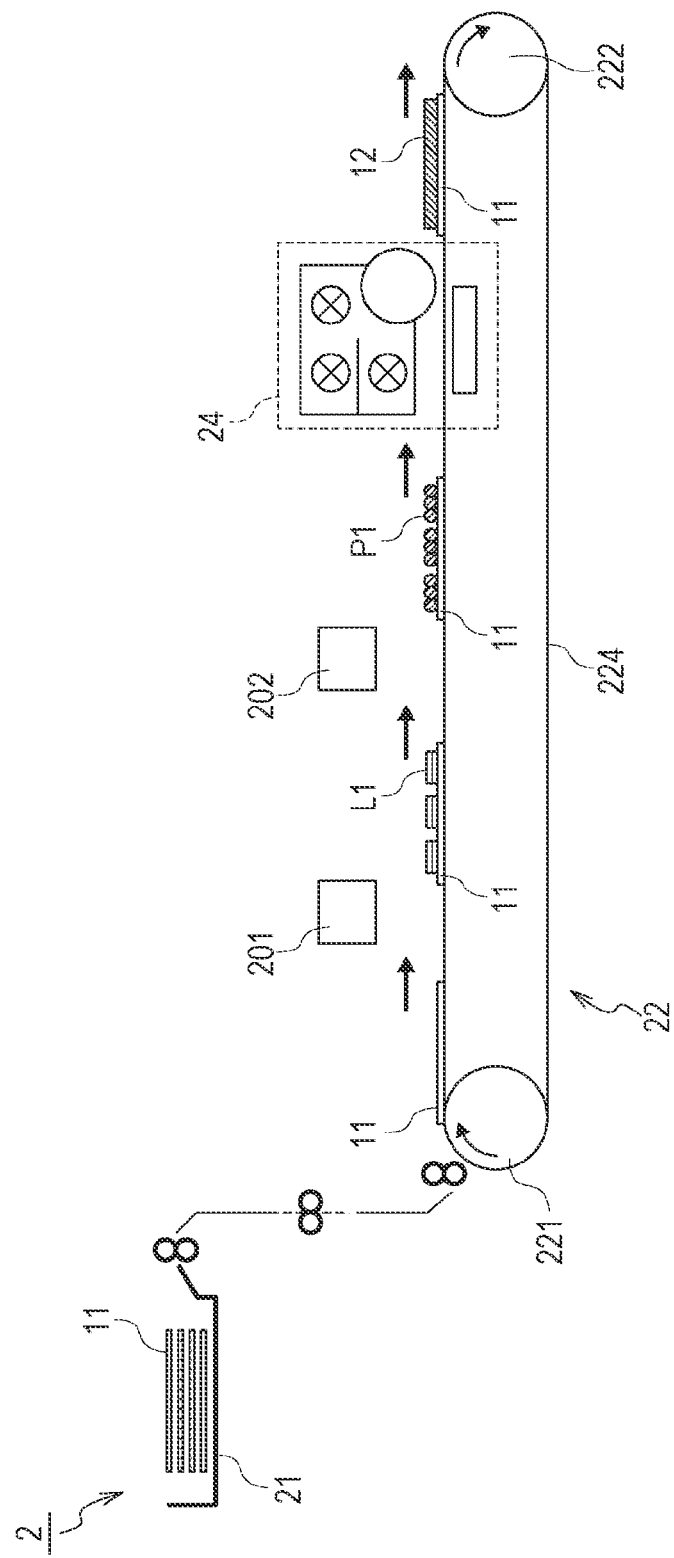
FIG. 10 is a schematic diagram illustrating the configuration of a material-layer-forming apparatus according to a second embodiment.

FIG. 10 is a schematic diagram illustrating the configuration of a material-layer-forming apparatus 2 according to the present embodiment. The same portions as in the material-layer-forming apparatus 1 are indicated by the same references and explanations may be appropriately omitted.

The material-layer-forming apparatus 2 is an apparatus to form a material layer 12 on a base material 11 and includes a storage container 21 that stores and feeds the base material 11 and a belt device 22 that transports the base material 11. The material-layer-forming apparatus 2 includes a liquid-applying device 201 that arranges the liquid in a pattern on the base material 11 and a powder-applying device 202 that applies a powder containing first particles P1 to the base material 11 on which the liquid is arranged in a pattern. The material-layer-forming apparatus 2 further includes a filling device 24 that has the same configuration as the configuration of the second filling device 24b in the first embodiment.

In the material-layer-forming apparatus 2, the liquid-applying device 201 and the powder-applying device 202 correspond to a first arranging device that arranges the first particles P1 in a pattern on the base material 11. Meanwhile, the filling device 24 corresponds to a second arranging device that arranges the second particles P2 in regions in which the first particles P1 are not arranged on the base material 11.

The liquid-applying device 201 arranges the liquid in a pattern on the base material 11 so as to form a liquid pattern L1 on the base material 11. Regarding the liquid-applying device 201, typically an ink jet apparatus may be used. However, the liquid-applying device 201 is not limited to this, and a plate-based method such as a flexographic plate may be applied. For example, in the case in which a large amount of patterns having the same shape are formed, using the plate-based method may be efficient. Meanwhile, the liquid-applying device 201 may be configured to apply a gel instead of a liquid within the bounds of having fluidity for ejection. The viscosity of the ejection fluid is appropriately adjusted in consideration of, for example, the drying rate of the pattern L1 arranged in a pattern, the affinity for the base material 11, and the stability of fixing of the particles P1. That is, the liquid-applying device 201 can also be referred to as a fluid-applying device 201. The liquid-applying device 201 according to the present embodiment is different from the patterning apparatus using ink jet described in the related art in that the materials for forming the positive electrode, the negative electrode, and the electrolyte which are functional components of the secondary battery are not ejected to the base material 11. The liquid-applying device 201 according to the present embodiment is different from the patterning apparatus using ink jet described in the related art in that a holding layer is patterned, the holding layer allowing the base material 11 to hold the materials for forming the positive electrode, the negative electrode, and the electrolyte, which are functional components of the secondary battery, as particles. Such a holding layer can be a form that is not used as an element for constituting a secondary battery by being provided with physical properties different from the particles serving as the functional material.

Examples of the ink jet apparatus applicable as the liquid-applying device 201 include ink jet apparatuses of various systems such as a thermal type, a piezoelectric type, an electrostatic type, and a continuous type. There is no particular limitation regarding the ink jet apparatus provided that a liquid can be ejected. There is no particular limitation regarding the number of nozzles (ejection ports) included in the ink jet apparatus. The number of nozzles may be singular as in a dispenser or plural as in a line head. However, from the viewpoint of productivity, it is desirable that the ink jet apparatus has a plurality of nozzles.

There is no particular limitation regarding the liquid applied by the liquid-applying device 201 provided that the first particles P1 can be attached, and the liquid may be an aqueous liquid (for example, water-based ink) or an oil-based liquid (for example, an oil-based ink). The liquid-applying device 201 may form the pattern L1 by using a plurality of types of liquids. For example, the liquid-applying device 201 may apply two types of liquid materials that react on the base material 11 so as to increase the stickiness.

The powder-applying device 202 applies a powder containing the first particles P1 to the base material 11 on which the liquid is arranged in a pattern. Consequently, the first particles P1 are fixed by the liquid on the base material 11, and first particles P1 are fixed in a pattern shape corresponding to the pattern L1.

There is no particular limitation regarding the powder-applying device by using the powder-applying device 202, and a device that blows or a device that sprinkles the powder toward the base material 11 may be adopted. The powder-applying device 202 may further include a device to remove the first particles P1, which are not fixed on the base material 11 by the liquid, by the measure of vibration, air blowing, suction, or the like.

The material-layer-forming apparatus 2 may further include a drying device that controls the amount of the liquid on the base material 11, the thickness of the pattern L1, and the like by vaporizing at least part of the liquid applied by the liquid-applying device 201. The drying device may be disposed downstream of the liquid-applying device 201 and upstream of the powder-applying device 202.

The material-layer-forming apparatus 2 may include a heating device that heats the base material 11 provided with the first particles P1 by the powder-applying device 202. There is no particular limitation regarding the heating system of the heating device. For example, a contact type heat roller may be used, or a noncontact type system that applies infrared rays or microwaves may be adopted. In addition, heating may be performed by scanning energy rays such as laser light. In this regard, the heating device may be disposed on the back surface side of the belt 224 included in the belt device 22 or may be disposed on the surface side (on the carried base material 11 side).

According to the present embodiment, the first particles P1 can be arranged in a pattern on the base material 11 by using the liquid-applying device 201 and the powder-applying device 202. The base material 11 on which the first particles P1 are arranged in a pattern is transported to the filling position of the filling device 24 by the belt device 22. The filling device 24 introduces the second particles P2 into portions in which the first particles P1 are not arranged on the base material 11. Since introduction of the second particles P2 by the filling device 24 is the same as in the first embodiment (second filling device 24b), explanations may be omitted thereafter.

As described above, according to the material-layer-forming apparatus 2 of the present embodiment, the material layer in which a single type of or a plurality of types of particles are arranged in any pattern on the base material 11 and the particles are densely arranged can be formed in the same manner as in the first embodiment.

Third Embodiment

A method for manufacturing a three-dimensional object and an additive manufacturing system that are the third embodiment according to the present invention will be described with reference to the drawings.

Figure 11:
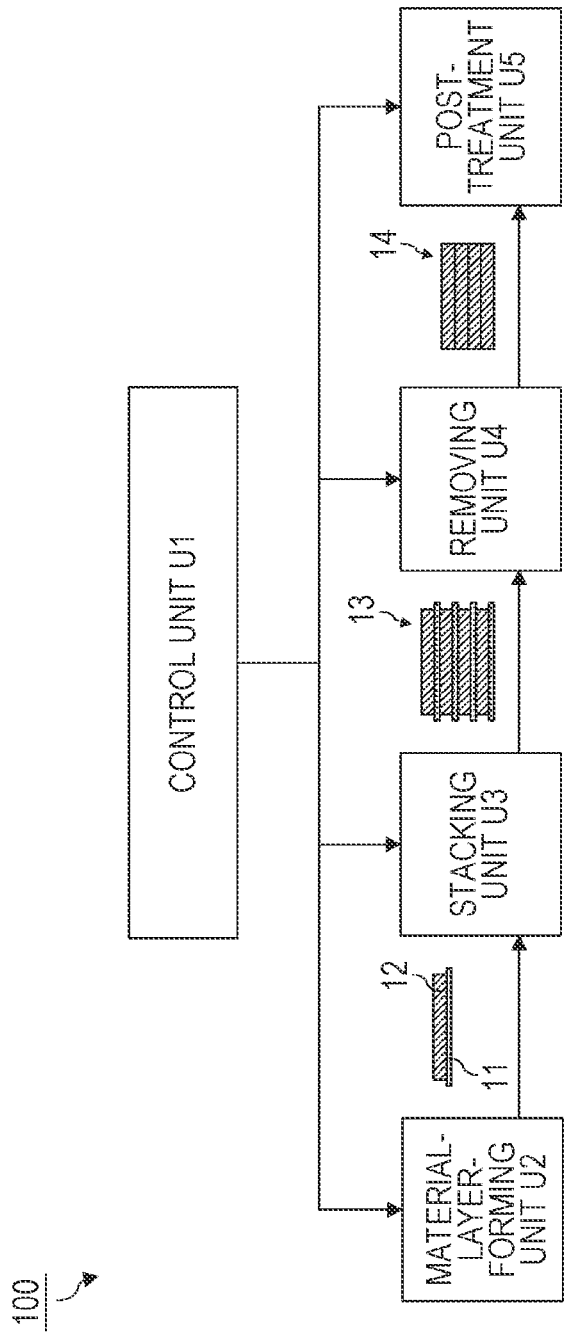
FIG. 11 is a schematic diagram illustrating the overall configuration of an additive manufacturing system according to a third embodiment.

FIG. 11 is a schematic diagram illustrating the overall configuration of an additive manufacturing system 100 according to a third embodiment.

The additive manufacturing system 100 according to the present embodiment includes a control unit U1, a material-layer-forming unit U2, a stacking unit U3, a removing unit U4, and a post-treatment unit U5. The control unit U1 takes responsibility for control and the like of each portion of the additive manufacturing system 100. The material-layer-forming unit U2 forms a material layer 12 on a base material 11. The stacking unit U3 stacks a plurality of base materials 11 each of which is provided with the material layer 12 by the material-layer-forming unit U2 so as to form a multilayer body 13 including the plurality of material layers 12 and the plurality of base materials 11. The removing unit U4 removes the base materials 11 from the multilayer body 13 formed by the stacking unit U3 so as to form a three-dimensional object 14. The post-treatment unit U5 performs post treatment of the three-dimensional object 14 formed by the removing unit U4. The unit configuration illustrated in FIG. 11 is merely an example, and other configurations may be adopted. The configuration and the action of each unit will be described below.

Control Unit

The control unit U1 takes responsibility for control and the like of each portion, specifically the material-layer-forming unit U2, the stacking unit U3, the removing unit U4, and the post-treatment unit U5, of the additive manufacturing system 100.

The control unit U1 may include a three-dimensional shape data input portion that receives three-dimensional shape data of a three-dimensional object (hereafter also referred to as "modeling object") to be formed by the additive manufacturing system 100 from an external apparatus (for example, a personal computer). Examples of the three-dimensional shape data include data formed by and output from a three-dimensional CAD, a three-dimensional modeler, and a three-dimensional scanner. There is no particular limitation regarding the file format, and, for example, STL (StereoLithography) file format can be favorably used.

The control unit U1 may include a slice data calculation portion that calculates a cross-sectional shape of each layer by slicing the three-dimensional shape data at a predetermined pitch and, on the basis of the resulting cross-sectional shape, forms image data used for image formation in the material-layer-forming unit U2 (referred to as "slice data"). Further, the slice data calculation portion may analyze the three-dimensional shape data or the slice data of the upper layer and the lower layer so as to determine presence or absence of an overhang portion (suspended portion) and, as the situation demands, add an image for a support material to the slice data.

The material-layer-forming unit U2 according to the present embodiment can form a material layer in which a plurality of types of materials are used and each material is patterned, as described later in detail. Therefore, regarding the slice data, the data corresponding to the image of each material may be formed. Regarding the file format of the slice data, for example, multivalued image data (each value represents the type of the material) or multiplane image data (each plane corresponds to a type of the material) may be used.

Although not illustrated in the drawing, the control unit U1 also includes an operation portion, a display portion, and a memory portion. The operation portion is a function of receiving instructions from the user. For example, on/off of a power supply, various settings of devices, instructions of actions, and the like can be input. The display portion is a function of providing the user with information. For example, various setting screens, error messages, action situations, and the like can be provided. The memory portion is a function of storing the three-dimensional shape data, the slice data, various setting values, and the like.

The hardware of the control unit U1 may be composed of a computer including a CPU (central processing unit), a memory, auxiliary storage units (hard disk, flash memory, and the like), an input device, a display device, and various I/F. Each of the above-described functions is realized by the CPU reading and executing programs stored in the auxiliary storage units and the like and controlling necessary devices. In this regard, some or all of the above-described functions may be composed of circuits such as ASIC and FPGA or may be executed by other computers using the technology of cloud computing, grid computing, or the like.

Material-Layer-Forming Unit

The material-layer-forming unit U2 is a unit that forms the material layers 12 on the base material 11. Regarding the material-layer-forming unit U2, the material-layer-forming apparatus 1 according to the first embodiment or the material-layer-forming apparatus 2 according to the second embodiment may be used.

The additive manufacturing system 100 may include a plurality of material-layer-forming units U2. Consequently, formation of the material layers 12 on the respective base materials 11 can be simultaneously performed, and the throughput of formation of the multilayer body and the three-dimensional object can be further improved. Meanwhile, in the case in which the three-dimensional object is composed of a large number of types of materials, switching of the material species and switching of the process in the material-layer-forming unit U2 may be skipped by disposing the material-layer-forming unit U2 on a material species basis or on a group of the material species basis. As a result, the three-dimensional object can be produced continuously.

The case in which the material-layer-forming unit U2 forms the material layer 12 on the base material 11 by using a system composed of combining introduction of the material into the recessed portions of the uneven pattern and transfer of the introduced material to the base material will be described below.

Stacking Unit

The stacking unit U3 is a unit that stacks the plurality of base materials 11 each of which is provided with the material layer 12 by the material-layer-forming unit U2 so as to form the multilayer body 13 including the plurality of material layers 12 and the plurality of base materials 11.

Figure 12:
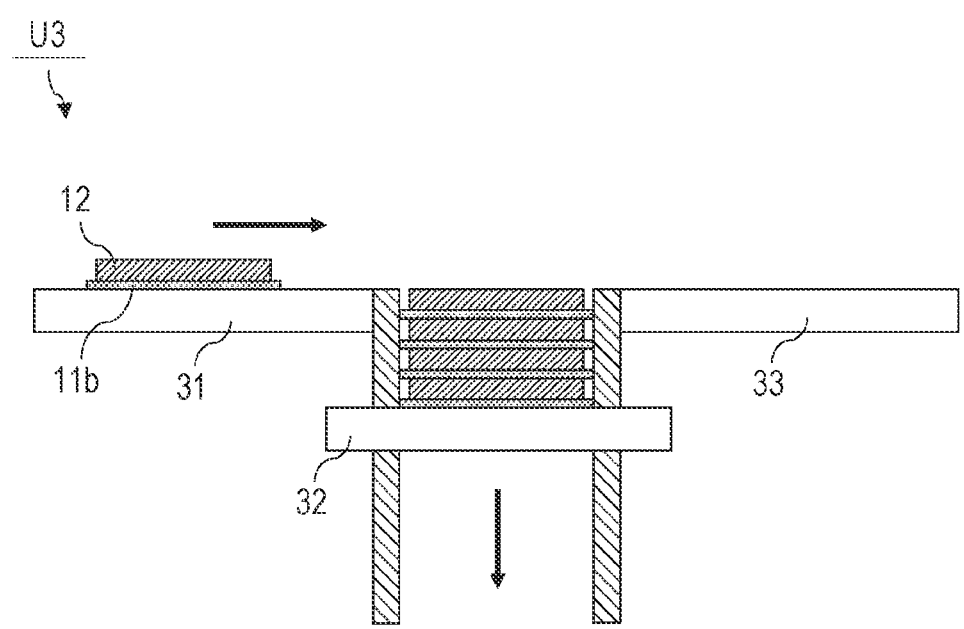
FIG. 12 is a schematic diagram illustrating the configuration of a stacking unit.

FIG. 12 is a schematic diagram illustrating the configuration of the stacking unit U3. The stacking unit U3 includes a transport device 31 that transports the base material 11 provided with the material layer 12 and a stage 32 that can be relatively moved in the vertical direction by an actuator not illustrated in the drawing.

The transport device 31 receives the base material 11 provided with the material layer 12 from the material-layer-forming unit U2 and transports to the stage 32. There is no particular limitation regarding the transport device 31 provided that the base material 11 can be transported, and the transport device 31 may be a belt conveyer, a roller, or a robot arm.

When the base material 11 is transported to the stage 32 by the transport device 31, the stage 32 is moved in the vertical direction by a distance corresponding to the thickness of the base material 11 and the material layer 12. Repetition of transportation by the transport device 31 and movement of the stage 32 stacks the plurality of base materials 11 provided with the respective material layers 12 so as to form the multilayer body 13.

The stacking unit U3 may further include a transport device 33 that transports the resulting multilayer body 13 to the removing unit U4 or the like and a pressure device (not illustrated in the drawing) that pressurize the multilayer body 13 in the stacking direction. The transport device 33 may have the same configuration as the configuration of the transport device 31.

Removing Unit

The removing unit U4 is a unit that removes the base materials 11 from the multilayer body 13 formed by the stacking unit U3 so as to form the three-dimensional object 14.

There is no particular limitation regarding the method for removing the base materials 11 from the multilayer body 13 by the removing unit U4. The removing unit U4 may remove the base materials 11 by heating the multilayer body 13, may remove the base materials 11 by dissolving the base materials 11 into a solvent, or may mechanically remove the base materials 11 by the wind pressure or hydraulic pressure. In the case in which the base materials 11 are mechanically removed, the base materials 11 may be made brittle due to heating or a solvent, and, thereafter the resulting base materials 11 may be mechanically removed. Of these, it is desirable that the removing unit U4 remove the base materials 11 by heating the multilayer body 13. Removal by heating enables the force applied to the material layers on and under the base material that is the target of removal to be reduced in removal so as to facilitate maintaining the structure of the material layer. In addition, since heat can also be applied to inside the multilayer body, the base material inside the multilayer body is readily removed and the base material removal rate can be readily increased. The case in which the removing unit U4 removes the base materials 11 by heating will be described below.

Figure 13:
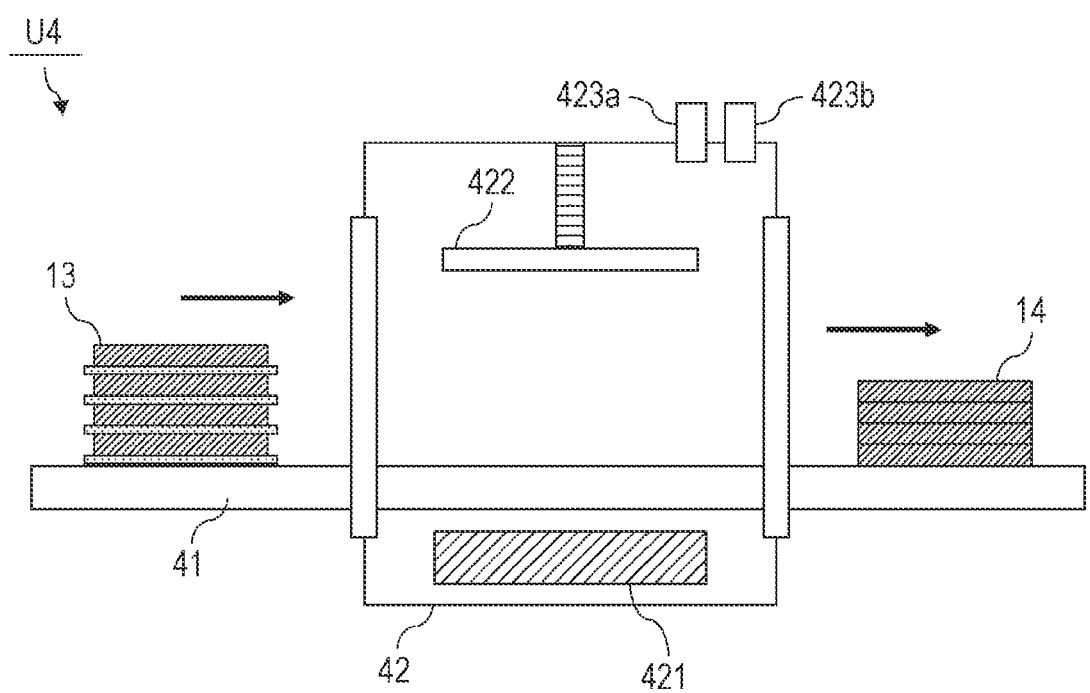
FIG. 13 is a schematic diagram illustrating the configuration of a removing unit.

FIG. 13 is a schematic diagram illustrating the configuration of the removing unit U4. The removing unit U4 includes a transport device 41 that transports the multilayer body 13 and a heating furnace 42 that heats the multilayer body 13.

The transport device 41 receives the multilayer body 13 from the stacking unit U3 and transports to the furnace 42. There is no particular limitation regarding the transport device 41 provided that the multilayer body 13 can be transported, and the transport device 41 may be a belt conveyer, a roller, or a robot arm in the same manner as the transport device 31.

The furnace 42 is a furnace that heats the multilayer body 13. The furnace 42 includes a heating device 421, a pressure device 422, and an atmosphere-adjusting device 423. Regarding the furnace 42, a firing furnace used to fire ceramic and the like may be used. The pressure device 422 pressurizes the multilayer body 13 that is heated in the furnace 42 or pressurizes the multilayer body 13 before and after the heating. Regarding the pressure device 422, it is desirable that a pressure portion to pressurize the multilayer body 13 is formed from a porous body which readily passes through gas. The atmosphere-adjusting device 423 includes an atmospheric-gas feed device 2a and a decompression device 423b and adjusts the atmospheric gas in a treatment space of the furnace 42.

The removing unit U4 performs heating at a temperature higher than or equal to the thermal decomposition temperature of the base materials 11 in the multilayer body 13 and at a temperature lower than the thermal decomposition temperature of each material layer in the multilayer body 13. Consequently, the base materials in the multilayer body 13 can be selectively decomposed and the base materials can be removed. In the case in which a plurality of types of base materials 11 formed of different materials are included in the multilayer body 13, the heating temperature by the removing unit U4 has to be a temperature higher than or equal to the highest thermal decomposition temperature of the respective thermal decomposition temperatures of the plurality of base materials.

In the present specification, the thermal decomposition temperature denotes the temperature at which the material begins weight reduction when the temperature is slowly increased in the atmosphere of the heating by the removing unit U4. Therefore, heating the multilayer body at a temperature higher than or equal to the thermal decomposition temperature of the base materials 11 enables the base materials 11 in the multilayer body to be decomposed so as to reduce the weight of the base materials 11 and to remove the base materials 11 from the multilayer body. It is desirable that the heating temperature in the removal process be a temperature higher than or equal to the thermal decomposition temperature of the base materials 11, and heating is performed desirably at a temperature further higher than the thermal decomposition temperature. Specifically, it is desirable that heating be performed at a temperature higher than or equal to the temperature at which 70% of the initial weight is reached when thermogravimetric analysis is performed where the temperature is increased from room temperature (25° C.) at a rate of 5° C./min in an atmosphere (typically air) in heating by the removing unit U4. More desirably, heating is performed at a temperature higher than or equal to the temperature at which 50% of the initial weight is reached when thermogravimetric analysis is performed in the same manner, and further desirably, heating is performed at a temperature higher than or equal to the temperature at which 20% of the initial weight is reached. Consequently, the time required for removing the base materials 11 can be reduced, and the removal rate of the base materials 11 can be increased.

That is, in the case in which the removing unit U4 removes the base materials 11 by heating, desirably, the materials for forming the first particles P1 and the second particles P2 have higher thermal decomposition temperatures than the base materials 11. In general, the inorganic material tends to have a higher thermal decomposition temperature than the organic material. Therefore, it is desirable that the materials for forming the first particles P1 and the second particles P2 be inorganic materials, and that the material for forming the base materials 11 be organic materials such as resins. In the case in which the removing unit U4 removes the base materials 11 by heating, desirably, the materials for forming the first particles P1 and the second particles P2 have softening temperatures higher than the thermal decomposition temperatures of the base materials 11. In addition, as described above, regarding the first particles P1 and the second particles P2, it is desirable to use particles formed of the materials selected from positive electrode materials, materials containing a solid electrolyte, and negative electrode materials of lithium ion batteries and all-solid-state batteries. As a result, all-solid-state batteries, electrode sheets such as positive electrode sheets and negative electrode sheets, solid electrolyte sheets, and the like can be produced.

The removing unit U4 eliminates preferably 90% by weight or more of the base materials in the multilayer body 13 by heating, eliminates more preferably 95% by weight or more, and eliminates further preferably 97% by weight or more. At this time, desirably, the base materials are burnt or gasified and discharged as gas to the outside. In this regard, using a base material formed of an organic material, for example, a resin, enables removal of the base material by heating to be facilitated. Examples of the material used for constituting the base material include polyethylenes (PE), polypropylenes (PP), polyesters such as polyethylene terephthalates (PET), and polyamides such as nylons. Of these, from the viewpoint of the decomposition temperature and low harmfulness of the gas generated in thermal decomposition, it is desirable that PET be used.

Desirably, the removing unit U4 exhausts released gas to the outside from the furnace 42 by using the decompression device 423b. Setting the inside of the furnace 42 to be an oxidizing atmosphere, that is, an atmosphere containing an oxide gas such as air by using the atmospheric-gas feed device 2a or the like enables the base material to be removed by burning.

When the base materials are gasified by thermal decomposition and are released as gas from the multilayer body 13, each material layer in the multilayer body 13 may be pushed up and the shape may be changed. Therefore, when heating is performed in the furnace 42, it is desirable that the multilayer body 13 be pressurized by the pressure device 422 before and after heating, during heating, or during cooling or heat dissipation after heating.

Post-Treatment Unit

The post-treatment unit U5 is a unit that performs post treatment of the three-dimensional object 14 formed by the removing unit U4.

There is no particular limitation regarding the type of the post treatment performed by the post-treatment unit U5, and examples of the post treatment include treatment to further heat the three-dimensional object 14 so as to perform firing. In this regard, in the case in which the post-treatment unit U5 performs heat treatment as the post treatment, the removing unit U4 may also have the function. Firing the three-dimensional object 14 enables the materials such as particle materials in each material layer to be sintered with each other.

In the same manner as in the removing unit U4, the post-treatment unit U5 may include a pressure device configured to pressurize the three-dimensional object 14. The post-treatment unit U5 may pressurize the three-dimensional object 14 by using the pressure device before heating as the post treatment, during heating, or during cooling or heat dissipation after heating.

The post-treatment unit U5 may perform treatment to remove at least one material constituting the three-dimensional object 14 from the three-dimensional object 14. For example, in the case in which the three-dimensional object 14 is formed from the first particle materials P1 and the second particle materials P2, after adhesion or integration is performed by, for example, sintering the first particle materials P1 with each other, the second particle materials P2 only may be selectively removed by air blow or the like. At this time, the second particle materials P2 function as so-called support materials in the additive manufacturing method and have a function of supporting the first particle materials P1 when stacking. Consequently, a three-dimensional object can be modeled by using the first particle materials P1. In the case in which the first particle materials P1 only are made to adhere to each other, for example, a particle having a high sintering temperature than the first particle materials P1 may be used as the second particle materials P2 and heating may be performed at a temperature higher than or equal to the sintering temperature of the first particle materials P1 and lower than the sintering temperature of the second particle materials P2.

As described above, according to the present embodiment, the throughput in production of the three-dimensional object by additive manufacturing can be improved.

According to the present embodiment, forming the material layers on the base materials by using the positive electrode materials, the negative electrode materials, and the materials containing a solid electrolyte of lithium ion batteries and all-solid-state batteries enables electrode sheets such as positive electrode sheets and negative electrode sheets and solid electrolyte sheets to be produced. According to the present embodiment, since particulate materials can be densely arranged in any pattern, electrode sheets and solid electrolyte sheets having high electrochemical characteristics can be provided. When the electrode sheets are produced, patterning the material containing a solid electrolyte in addition to the positive electrode material and the negative electrode material enables a favorable interface between the positive electrode material or the negative electrode material and the material containing the solid electrolyte to be formed. Forming the three-dimensional object by using the positive electrode materials, the negative electrode materials, and the materials containing the solid electrolyte enables the all-solid-state batteries to be produced.

EXAMPLES

Examples 1 to 9

Material layers 1 to 9 were formed by using the above-described material-layer-forming apparatus 1.

In the first belt device 22a and the second belt device 22b, polyimide resin belts were used as the transport members 224a and 224b. Stainless steel metal rollers were used as the drive rollers 221 and the drive rollers 222, and soft rollers in which a silicone rubber elastic layer was disposed on the stainless steel core metal were used as the pressure rollers 223.

A polyester (PET) sheet was used as the first base material 11a. A honeycomb-pattern-shaped uneven pattern was formed on the first base material 11a by the pattern-forming device 23. The first base material 11a is coated with an ultraviolet-curable resin (ultraviolet-curable liquid silicone rubber, PDMS, produced by Shin-Etsu Chemical Co., Ltd.). Thereafter, a film mold (Standard mold, Soken Chemical and Engineering Co., Ltd.) having the honeycomb-pattern-shaped uneven pattern, which corresponded to the uneven pattern to be formed, on the surface was pressed against the ultraviolet-curable resin on the first base material 11a. The ultraviolet-curable resin with the film mold pressed against was cured by being irradiated with ultraviolet rays from a UV lamp, and the film mold was peeled off.

Figure 14A:
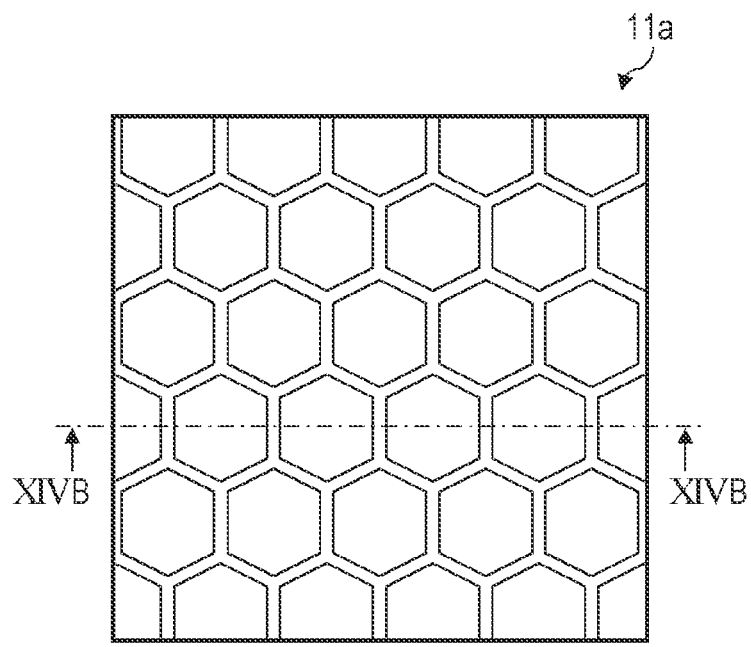
FIG. 14A is a schematic diagram illustrating the structure of a first base material provided with an uneven pattern on the surface.
Figure 14B:
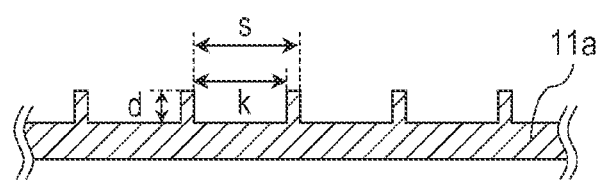
FIG. 14B is a schematic diagram illustrating the structure of a first base material provided with an uneven pattern on the surface.

FIG. 14 illustrates the structure of the first base material 11a provided with an uneven pattern 111a on the surface. FIG. 14A is a top view of the first base material 11a, and FIG. 14B is a sectional view cut along line XIVB-XIVB in FIG. 14A. As illustrated in FIG. 14, a honeycomb-pattern-shaped uneven pattern having hexagonal frame-like protruding portions was formed on the first base material 11a. In this regard, as illustrated in FIG. 14B, the distance between adjacent protruding portions (that is, the width of the recessed portion) is denoted as k (μm), the pitch of the adjacent protruding portions is denoted as s (μm), and the height of the protruding portion (that is, the depth of the recessed portion) is denoted as d (μm). In the following examples, the shape of the uneven pattern was measured by using a noncontact surface and layer cross-sectional shape measurement system (VertScan2.0 produced by Ryoka Systems Inc.).

Regarding the second base material 11b, a polyester (PET) sheet having the surface coated with an acrylic adhesive was used.

Regarding the first particles P1 and the second particles P2, any one of $LiCoO_2$ (hereafter referred to as LCO), $Li_{1.5}Al_{0.5}Ge_{1.5}P_3O_{12}$ (hereafter referred to as LAGP), $Li_{6.75}La_3Zr_{1.75}Nb_{0.25}O_{12}$ (hereafter referred to as LLZ), $Li_3BO_3$ (hereafter referred to as LBO), and graphite was used. In this regard, lithium cobaltate LCO is a positive electrode material, aluminum-substituted lithium germanium phosphate LAGP, LLZ, and lithium borate LBO are materials containing a solid electrolyte, and graphite is a negative electrode material. Lithium cobaltate $LiCoO_2$ produced by NIPPON CHEMICAL INDUSTRIAL CO., LTD., can be used. Likewise, $Li_{1.5}Al_{0.5}Ge_{1.5}P_3O_{12}$ can be used. Meanwhile, $Li_{6.75}La_3Zr_{1.75}Nb_{0.25}O_{12}$ produced by Toshima Manufacturing Co., Ltd., can be used. The abbreviation may be LLZNb instead of LLZ. Lithium borate $Li_3BO_3$ produced by Toshima Manufacturing Co., Ltd., can be used. Regarding graphite, SGP-5 produced by SEC CARBON, LTD., can be used.

Regarding the bearing materials S1 and the bearing materials S2, any one of a standard carrier (Standard Carrier P02 produced by the Imaging Society of Japan) and a domestic carrier (produced by CANON KABUSHIKI KAISHA), which are magnetic particles, was used. The domestic carrier was particles in which holes of porous ferrite particles were filled with a resin. When material layer 1 was formed, the proportion of the first particles P1 in the filler 241a was set to be 17% by weight, and the proportion of the second particles P2 in the filler 241b was set to be 45% by weight. Each of material layers 1 to 9 was formed on the second base material 11b on the basis of the first embodiment where the size (distance k, pitch s, and depth d) of the uneven pattern 111a formed on the first base material 11a and the filler were changed as described in Table 1. When material layer 8 was formed, a polyester sheet was used as the first base material 11a, and OP-4003 produced by DIC Corporation was used as the ultraviolet-curable resin.

TABLE 1

| | | Filler 241a | | Filler 241b | | First base material 11a | | |
|---|---|---|---|---|---|---|---|---|
| | | First particle P1 | Bearing material S1 | Second particle P2 | Bearing material S2 | Uneven pattern 111a | | |
| | | | | | | Distance k/μm | Pitch s/μm | Depth d/μm |
| Example 1 | Material layer 1 | LCO | standard carrier | LAGP | domestic carrier | 16 | 18 | 5 |
| Example 2 | Material layer 2 | LCO | standard carrier | LAGP | standard carrier | 16 | 18 | 5 |
| Example 3 | Material layer 3 | LCO | standard carrier | LCO | standard carrier | 16 | 18 | 5 |
| Example 4 | Material layer 4 | LCO | standard carrier | LCO | standard carrier | 16 | 18 | 5 |
| Example 5 | Material layer 5 | LAGP | domestic carrier | LAGP | domestic carrier | 16 | 18 | 5 |
| Example 6 | Material layer 6 | LCO | standard carrier | LLZ | standard carrier | 16 | 18 | 5 |
| Example 7 | Material layer 7 | LCO | standard carrier | LBO | standard carrier | 16 | 24 | 5 |
| Example 8 | Material layer 8 | LLZ | standard carrier | LLZ | standard carrier | 8 | 10 | 2 |
| Example 9 | Material layer 9 | graphite | standard carrier | graphite | standard carrier | 16 | 18 | 5 |

The particle diameters of the respective particles in the filler used for forming each material layer were as described in Table 2. In Table 2, the particle diameters (r10, r50, and r90) of the respective particles are the particle diameters based on the cumulative distribution with respect to the particle size distribution on a volume basis, r10 is a particle diameter at a cumulative volume of 10%, r50 is at a cumulative volume of 50%, and r90 is at a cumulative volume of 90%. That is, r50 is a median diameter. In this regard, the particle diameters were measured by using a laser diffraction-scattering particle diameter distribution analyzer (LA-960 produced by HORIBA, Ltd.).

TABLE 2

| | | First base material 11a Uneven pattern 111a | | | Filler 241a | | | | | | Filler 241b | | | | | | Evaluation Result |
|---|---|---|---|---|---|---|---|---|---|---|---|---|---|---|---|---|---|
| | | | | | First particle P1 | | | Bearing material S1 | | | Second Particle P2 | | | Bearing material S2 | | | |
| | | Distance k/μm | Pitch s/μm | Depth d/μm | r10/ μm | r50/ μm | r90/ μm | r10/ μm | r50/ μm | r90/ μm | r10/ μm | r50/ μm | r90/ μm | r10/ μm | r50/ μm | r90/ μm | |
| Example 1 | Material layer 1 | 16 | 18 | 5 | 3.9 | 7.1 | 13 | 60 | 81 | 113 | 1.4 | 4.6 | 43 | 31 | 40 | 55 | A |
| Example 2 | Material layer 2 | 16 | 18 | 5 | 3.9 | 7.1 | 13 | 60 | 81 | 113 | 5.6 | 29 | 60 | 60 | 81 | 113 | B |
| Example 3 | Material layer 3 | 16 | 18 | 5 | 3.9 | 7.1 | 13 | 60 | 81 | 113 | 3.9 | 7.1 | 13 | 60 | 81 | 113 | A |
| Example 4 | Material layer 4 | 16 | 18 | 5 | 3.9 | 7.1 | 13 | 60 | 81 | 113 | 6.0 | 9.6 | 14.1 | 60 | 81 | 113 | B |

TABLE 2-continued

| | | First base material 11a Uneven pattern 111a | | | Filler 241a | | | | | | Filler 241b | | | | | | Evaluation Result |
|---|---|---|---|---|---|---|---|---|---|---|---|---|---|---|---|---|---|
| | | | | | First particle P1 | | | Bearing material S1 | | | Second Particle P2 | | | Bearing material S2 | | | |
| | | Distance k/μm | Pitch s/μm | Depth d/μm | r10/ μm | r50/ μm | r90/ μm | r10/ μm | r50/ μm | r90/ μm | r10/ μm | r50/ μm | r90/ μm | r10/ μm | r50/ μm | r90/ μm | |
| Example 5 | Material layer 5 | 16 | 18 | 5 | 1.4 | 4.6 | 43 | 31 | 40 | 55 | 1.4 | 4.6 | 43 | 31 | 40 | 55 | A |
| Example 6 | Material layer 6 | 16 | 18 | 5 | 3.9 | 7.1 | 13 | 60 | 81 | 113 | 0.57 | 2.4 | 4 | 60 | 81 | 113 | A |
| Example 7 | Material layer 7 | 16 | 24 | 5 | 3.9 | 7.1 | 13 | 60 | 81 | 113 | 6.8 | 9.8 | 15 | 60 | 81 | 113 | A |
| Example 8 | Material layer 8 | 8 | 10 | 2 | 0.57 | 2.4 | 4 | 60 | 81 | 113 | 0.57 | 2.4 | 4 | 60 | 81 | 113 | A |
| Example 9 | Material layer 9 | 16 | 18 | 5 | 2.5 | 5.5 | 10 | 60 | 81 | 113 | 2.5 | 5.5 | 10 | 60 | 81 | 113 | A |

The denseness of the resulting material layers 1 to 9 was evaluated by the method described below. Specifically, the second base material 11b provided with each material layer was imaged from the material layer side by using an optical microscope, and the coverage of the particles in the observation region was measured by using image processing software (Photoshop (registered trademark) produced by Adobe Systems). The case where the coverage was 85% or more was rated as A, the case where the coverage was less than 85% and 80% or more was rated as B, and the case where the coverage was less than 80% was rated as C. If the coverage is less than 80%, it is difficult to form a sufficiently dens material layer even when the resulting material layer is subjected to post treatment such as sintering treatment.

As is clear from Table 2, regarding each of the material layers 1 to 9, the coverage was 80% or more and a dense material layer was formed. Regarding material layer 2 and material layer 4, the size of the second particles P2 was large compared with the cases of the other material layers. In the case of material layer 2, since the median diameter r50 of the second particles P2 is larger than the recessed portion of the uneven pattern formed by the first particles P1, the proportion of the second particles P2 that can come into contact with the bottom portions of the recessed portions is small. Meanwhile, regarding material layer 4, although the median diameter r50 of the second particles P2 is smaller than the recessed portion of the uneven pattern formed by the first particles P1, the difference is small, and the proportion of the second particles P2 that can come into contact with the bottom portions of the recessed portions is small compared with the cases of the other material layers. Therefore, it is conjectured that material layer 2 and material layer 4 had slightly smaller coverage than the other material layers.

Examples 10 to 20

Next, a three-dimensional object was formed by using the additive manufacturing system 100. Specifically, the material-layer-forming apparatus 1 illustrated in FIG. 2 was used as the material-layer-forming unit U2, a material layer was formed on a base material, the base materials provided with the respective material layers were stacked, and the base materials were removed from the multilayer body by heating so as to form an electrode sheet, an electrolyte sheet, and an all-solid-state battery which were three-dimensional objects.

The second base materials 11b were provided with the respective material layers in the same manner as in examples 1 to 9, and a multilayer body was formed by stacking a plurality of second base materials 11b as described in Table 3. The multilayer body was transported to a furnace and was heated in the furnace. The weight of the multilayer body was measured before and after the heating, and the weight ratio (wt %) of the base material before and after the heating was evaluated. Meanwhile, gold was sputtered on the upper surface and the lower surface of the multilayer body after the heating, a tester was placed on the upper surface and the lower surface so as to examine whether leakage occurs. The case in which leakage occurred was rated as B, and the case in which no leakage occurred was rated as A. The results are shown in Table 3. In this regard, when leakage occurs, the resistance value is estimated to be about 10Ω or less.

TABLE 3

| | Multilayer body No. | Material layer No. | Number of stacking | Furnace | | | Weight ratio of base material/wt % | Leakage evaluation |
|---|---|---|---|---|---|---|---|---|
| | | | | Atmosphere | Temperature T/° C. | Time h/min | | |
| Example 10 | 1 | 5 | 4 | air | 400 | 30 | 78 | B |
| Example 11 | 2 | 5 | 4 | air | 450 | 30 | 36 | B |
| Example 12 | 3 | 5 | 4 | air | 500 | 30 | 2 | A |
| Example 13 | 4 | 5 | 4 | air | 500 | 15 | 3 | A |
| Example 14 | 5 | 5 | 4 | air | 500 | 5 | 5 | A |
| Example 15 | 6 | 5 | 4 | air | 500 | 1 | 10 | A |

TABLE 3-continued

|  | Multilayer body No. | Material layer No. | Number of stacking | Atmosphere | Furnace Temperature T/° C. | Time h/min | Weight ratio of base material/wt % | Leakage evaluation |
|---|---|---|---|---|---|---|---|---|
| Example 16 | 7 | 1 | 2 | air | 500 | 30 | 2 | A |
| Example 17 | 8 | 3 | 2 | air | 500 | 30 | 2 | A |
| Example 18 | 9 | 6 | 2 | air | 500 | 30 | 2 | A |
| Example 19 | 10 | 7 | 2 | air | 500 | 30 | 2 | A |
| Example 20 | 11 | 8 | 4 | air | 500 | 30 | 2 | A |

Figure 15:
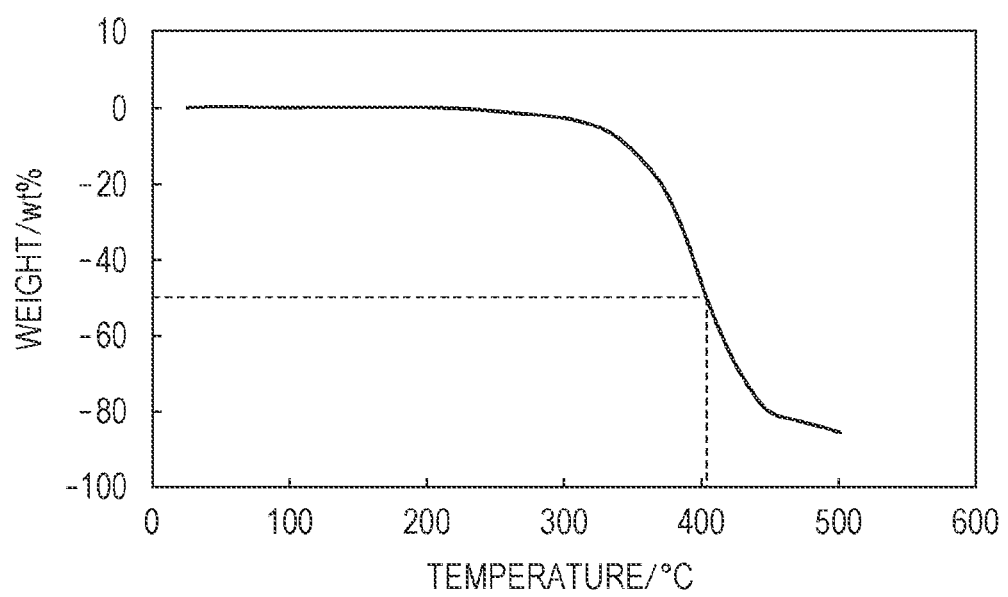
FIG. 15 is a diagram illustrating the thermogravimetric analysis results of a polyester sheet.

FIG. 15 is a diagram illustrating the thermogravimetric analysis results of a polyester (PET) sheet that is the second base material 11b. The thermogravimetric analysis was performed by using a differential thermobalance (TG-DTA produced by Rigaku Corporation) and increasing the temperature from room temperature (25° C.) at a rate of 5° C./min in the air. As illustrated in FIG. 15, the temperature at which 50% of the initial weight was reached was about 400° C., and the temperature at which 20% of the initial weight was reached was about 500° C. Regarding each of LCO, LAGP, LLZ, LBO, and graphite, the thermal decomposition temperature was 510° C. or higher.

A multilayer body was formed where the material layer, the number of stacking, and the heating condition were changed as described in Table 3. As a result, in each example, a three-dimensional object could be formed. In the case in which the heat treatment temperature was increased or the heating time was increased, the base material removal rate could be increased (examples 10 to 20). Regarding multilayer bodies 1 and 2 of examples 10 and 11, respectively, much more than 10% by weight of the base material remained after heat treatment in the furnace. As a result, it is conjectured that gasification was insufficient when the base material was thermally decomposed by heating and the base material remained as soot in the multilayer body so as to reduce the resistance of the multilayer body. Meanwhile, regarding multilayer bodies 3 to 11 of examples 12 to 20, respectively, the residual ratio of the base material after heat treatment in the furnace was 10% by weight or less, and leakage was not observed by the leakage test.

Examples 21 to 23

A multilayer body was formed by stacking a plurality of second base materials 11b provided with the respective material layers. The multilayer body was transported to a furnace and was heated in the furnace. Further, the multilayer body was transported to a firing furnace and was fired by heating in the firing furnace. In this manner, an all-solid-state battery was produced.

Example 21

Four material layers 9 (graphite), two material layers 5 (LAGP), and two material layers 1 (LCO+LAPG) together with the respective base materials were successively stacked on a S1 substrate in which gold was sputtered on the surface.

The resulting multilayer body was placed in the furnace and was heated in the air (atmosphere) at 500° C. for 30 minutes in the furnace so as to eliminate the base materials. Thereafter, heating was performed in a vacuum at 700° C. for 1 hour in the sintering furnace. In this manner, the all-solid-state battery 1 was produced.

Example 22

TWO material layers 5 (LAGP) and two material layers 1 (LCO+LAPG) together with the respective base materials were successively stacked on a graphite formed body. The resulting multilayer body was placed in the furnace and was heated in the air (atmosphere) at 500° C. for 30 minutes in the furnace so as to eliminate the base materials. Thereafter, heating was performed in a vacuum at 700° C. for 1 hour in the sintering furnace. In this manner, the all-solid-state battery 2 was produced. In this regard, the graphite formed body was formed by pressurizing and forming a graphite powder at 250 MPa by using a hydraulic pressing machine.

Example 23

Four material layers 9 (graphite) together with the respective base materials were stacked under an LLZ formed body and two material layers 7 (LCO+LBO) together with the respective base materials were stacked on the LLZ formed body. The resulting multilayer body was placed in the furnace and was heated in the air (atmosphere) at 500° C. for 30 minutes in the furnace so as to eliminate the base materials. After the base materials were eliminated, the multilayer body was pressurized. Subsequently, heating was performed in a vacuum at 700° C. for 1 hour in the sintering furnace. In this manner, the all-solid-state battery 3 was produced. In this regard, the LLZ formed body was formed by pressurizing and forming an LLZ powder at 250 MPa by using a hydraulic pressing machine and thereafter performing firing in the air at 1,150° C. for 36 hours. The upper surface and the lower surface of the resulting LLZ formed body were ground with sand paper.

Table 4 describes the evaluation results of the all-solid-state batteries of examples 21 to 23.

TABLE 4

| | All-solid-state battery No. | Battery configuration | | | Furnace | | | Sintering furnace | | | Evaluation result |
|---|---|---|---|---|---|---|---|---|---|---|---|
| | | Material layer No. | Number of stacking | Atmosphere | Temperature T/° C. | Time h/min | Atmosphere | Temperature T/° C. | Time h/h | |
| Example 21 | 1 | Positive electrode | 1 | 2 | air | 500 | 30 | vacuum | 700 | 1 | A |
| | | Solid electrolyte | 3 | 2 | | | | | | | |
| | | Negative electrode | 7 | 4 | | | | | | | |
| Example 22 | 2 | Positive electrode | 1 | 2 | air | 500 | 30 | vacuum | 700 | 1 | A |
| | | Solid electrolyte | 3 | 2 | | | | | | | |
| | | Negative electrode | formed body | — | | | | | | | |
| Example 23 | 3 | Positive electrode | 5 | 2 | air | 500 | 30 | vacuum | 700 | 1 | A |
| | | Solid electrolyte | formed body | — | | | | | | | |
| | | Negative electrode | 7 | 4 | | | | | | | |

Each all-solid-state battery was evaluated by performing a charge and discharge test by using an electrochemical apparatus (Model 1255WB produced by Solartron). Specifically, the case in which the charge capacity was 10 mAh/g or more and the discharge capacity was 1/10 times or more the charge capacity was rated as A. It was ascertained that each of the all-solid-state batteries performed charging and discharging so as to operate as a secondary battery.

As described above, according to the present embodiment, the electrode sheet and the electrolyte sheet of the battery could be produced and the all-solid-state battery could be produced. Since particles constituting these could be patterned, the battery having a three-dimensional structure in which particles were patterned in the plane direction and in the stacking direction could be produced.

The present invention is not limited to the above-described embodiments and can be variously changed and modified without departing from the spirit and scope of the invention. Therefore, to apprise the public of the scope of the present invention, the following claims are appended.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An electrode sheet for an electrode in a secondary battery comprising:
a plurality of first active material particles including an active material; and
a base sheet having a resin base film including a resin and a holding layer on the resin base film configured to hold the plurality of first active material particles, wherein the plurality of first active material particles has a higher thermal decomposition temperature in an atmosphere containing an oxide gas than the base sheet does,
further comprising a plurality of second active material particles that has a composition different from a composition of the plurality of first active material particles,
wherein a part of the plurality of second active material particles are configured to be held by the holding layer,
wherein an average diameter of the plurality of second active material particles is smaller than that of the plurality of first active material particles.

2. The electrode sheet according to claim 1, wherein the holding layer includes at least any one of an acrylic adhesive, a rubber-based adhesive, a silicone-based adhesive, a thermoplastic resin and a photo-curable resin.

3. The electrode sheet according to claim 1, wherein an average diameter of the plurality of first active material particles is larger than a thickness of the holding layer.

4. The electrode sheet according to claim 1, wherein the plurality of second active material particles includes a plurality of first layer particles in contact with the holding layer and a plurality of second layer particles not in contact with the holding layer.

5. The electrode sheet according to claim 1, wherein the resin base film includes at least any one of a polyethylene (PE), a polypropylene (PP) and a polyethylene terephthalate (PET).

6. The electrode sheet according to claim 1, wherein the part of the plurality of second active material particles held by the holding layer is located in an absent area where none of the plurality of first active material particles are located in.

7. The electrode sheet according to claim 1, wherein the base sheet, including the resin base film and the holding layer, is configured to serve as a thermal sacrificial member.

8. An electrode sheet for an electrode in a secondary battery comprising:
a plurality of active material particles including an active material; and
a base sheet having a resin base film including a resin and a holding layer on the resin base film configured to hold the plurality of active material particles,
wherein the plurality of active material particles has a higher thermal decomposition temperature in an atmosphere containing an oxide gas than the base sheet does,
wherein the base sheet, including the resin base film and the holding layer, is configured to serve as a thermal sacrificial member for the plurality of active material particles to be left in the electrode sheet after a curing step in the atmosphere containing the oxide gas.

* * * * *